(12) United States Patent
Kim et al.

(10) Patent No.: US 9,736,871 B2
(45) Date of Patent: Aug. 15, 2017

(54) METHOD FOR TRANSMITTING/RECEIVING INFORMATION RELATED TO ASSOCIATION IDENTIFIER IN WIRELESS COMMUNICATION SYSTEM AND DEVICE THEREFOR

(71) Applicant: LG ELECTRONICS INC., Seoul (KR)

(72) Inventors: Jeongki Kim, Anyang-si (KR); Yongho Seok, Anyang-si (KR); Hangyu Cho, Anyang-si (KR); Jinsoo Choi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 38 days.

(21) Appl. No.: 14/651,607

(22) PCT Filed: Dec. 12, 2013

(86) PCT No.: PCT/KR2013/011540
§ 371 (c)(1),
(2) Date: Jun. 11, 2015

(87) PCT Pub. No.: WO2014/092487
PCT Pub. Date: Jun. 19, 2014

(65) Prior Publication Data
US 2015/0373758 A1 Dec. 24, 2015

Related U.S. Application Data

(60) Provisional application No. 61/736,017, filed on Dec. 12, 2012, provisional application No. 61/737,061, (Continued)

(51) Int. Cl.
*H04W 76/02* (2009.01)
*H04L 1/18* (2006.01)
(Continued)

(52) U.S. Cl.
CPC ......... *H04W 76/021* (2013.01); *H04L 1/1829* (2013.01); *H04W 8/26* (2013.01);
(Continued)

(58) Field of Classification Search
None
See application file for complete search history.

(56) References Cited

U.S. PATENT DOCUMENTS 8,553,605 B2 * 10/2013 Cho ............... H04W 8/186
370/310
2006/0120334 A1 * 6/2006 Wang ............ H04W 76/023
370/338

(Continued)

FOREIGN PATENT DOCUMENTS

CN 1713775 12/2005
KR 1020090061505 6/2009
(Continued)

OTHER PUBLICATIONS

PCT International Application No. PCT/KR2013/011540, Written Opinion of the International Searching Authority dated Mar. 20, 2014, 15 pages.

(Continued)

*Primary Examiner* — Phirin Sam
*Assistant Examiner* — Faiyazkhan Ghafoerkhan
(74) *Attorney, Agent, or Firm* — Lee Hong Degerman Kang Waimey

(57) ABSTRACT

One embodiment of the present invention relates to a method for transmitting/receiving information related to an association identification (AID) in a wireless communication system, the transmitting/receiving method comprising: a step in which a second STA having a direct link to a first STA receives an announcement frame related to an updated AID from the first STA; and a step in which the second STA (Continued)

transmits an ACK frame in response to the announcement frame, wherein the announcement frame comprises one or more AID-MAC address pairs and the second STA updates the AID of an STA corresponding to the one or more AID-MAC address pairs.

15 Claims, 37 Drawing Sheets

Related U.S. Application Data filed on Dec. 13, 2012, provisional application No. 61/761,229, filed on Feb. 5, 2013, provisional application No. 61/811,100, filed on Apr. 11, 2013.

(51) Int. Cl.
*H04W 8/26* (2009.01)
*H04W 72/04* (2009.01)
*H04W 92/18* (2009.01)
*H04W 48/12* (2009.01)
*H04L 1/00* (2006.01)
*H04W 4/00* (2009.01)

(52) U.S. Cl.
CPC ..... *H04W 72/042* (2013.01); *H04W 72/0413* (2013.01); *H04L 2001/0097* (2013.01); *H04W 4/005* (2013.01); *H04W 48/12* (2013.01); *H04W 92/18* (2013.01)

(56) References Cited

U.S. PATENT DOCUMENTS

| | | | | |
|---|---|---|---|---|
| 2007/0189168 A1* | 8/2007 | Yao | ............. | H04L 63/20 370/231 |
| 2010/0322219 A1* | 12/2010 | Fischer | ............. | H04B 7/0452 370/338 |
| 2011/0007692 A1* | 1/2011 | Seok | ............. | H04W 40/22 370/328 |
| 2011/0075607 A1* | 3/2011 | Kim | ............. | H04B 7/0417 370/328 |
| 2011/0090821 A1* | 4/2011 | Seok | ............. | H04W 76/025 370/255 |
| 2012/0051312 A1 | 3/2012 | Noh et al. | | |
| 2012/0063335 A1* | 3/2012 | Cho | ............. | H04W 8/186 370/252 |
| 2013/0142184 A1* | 6/2013 | Wang | ............. | H04L 5/0053 370/338 |
| 2013/0163496 A1* | 6/2013 | Trainin | ............. | H04L 61/6022 370/311 |
| 2014/0010102 A1* | 1/2014 | Cho | ............. | H04W 8/186 370/252 |
| 2014/0204960 A1* | 7/2014 | Park | ............. | H04L 12/4633 370/474 |

FOREIGN PATENT DOCUMENTS

| | | | |
|---|---|---|---|
| KR | 10-2011-0095098 | 8/2011 | |
| KR | 10-2011-0102847 | 9/2011 | |
| KR | WO 2012096549 A2 * | 7/2012 | ........ H04W 52/0229 |
| RU | 2005141587 | 7/2007 | |
| WO | 2011/115408 | 9/2011 | |
| WO | 2011112056 | 9/2011 | |
| WO | 2011158407 | 12/2011 | |
| WO | 2012/077908 | 6/2012 | |
| WO | 2012096549 | 7/2012 | |

OTHER PUBLICATIONS

Merlin, Simone, "Wireless LANs", IEEE 802.11-12/0875r0, Jul. 16, 2012, 8 pages.
Seok, et al., "AID Assignment Protocol", IEEE 802.11-12/1304r0, Nov. 12, 2012, 18 pages.
Kim, et al., "AID update procedure for TDLS peer STA", IEEE 802.11-13/0291r0, Mar. 14, 2013, 12 pages.
Canadian Intellectual Property Office Application No. 2,895,065, Office Action dated Jun. 13, 2016, 4 pages.
European Patent Office Application No. 13862842.5, Search Report dated Jul. 5, 2016, 10 pages.
Seok, et al., "AID Reassignment Protocol", IEEE 802.11-12/0364r3, May 14, 2012, 11 pages.
Russian Federation Federal Service for Intellectual Property, Patents and Trademarks Application Serial No. 2015124006/07, Notice of Allowance dated Oct. 3, 2016, 17 pages.
The State Intellectual Property Office of the People's Republic of China Application Serial No. 201380070336.9, Office Action dated May 24, 2017, 14 pages.

* cited by examiner

FIG. 7

| Category | Action Details |
|---|---|

Octets :   1   variable

FIG. 8

| MAC Header | LLC/SNAP | Payload Type | Information | CRC |
|---|---|---|---|---|

Octets   ◄── variable ──►◄── 8 ──►◄── 1 ──►◄── variable ──►◄── 4 ──►

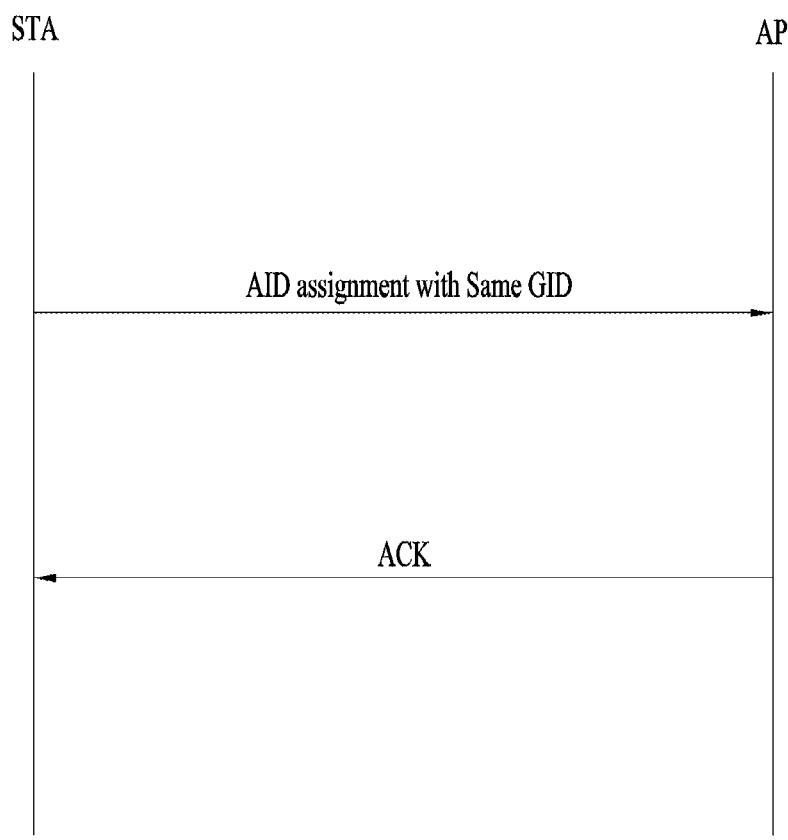

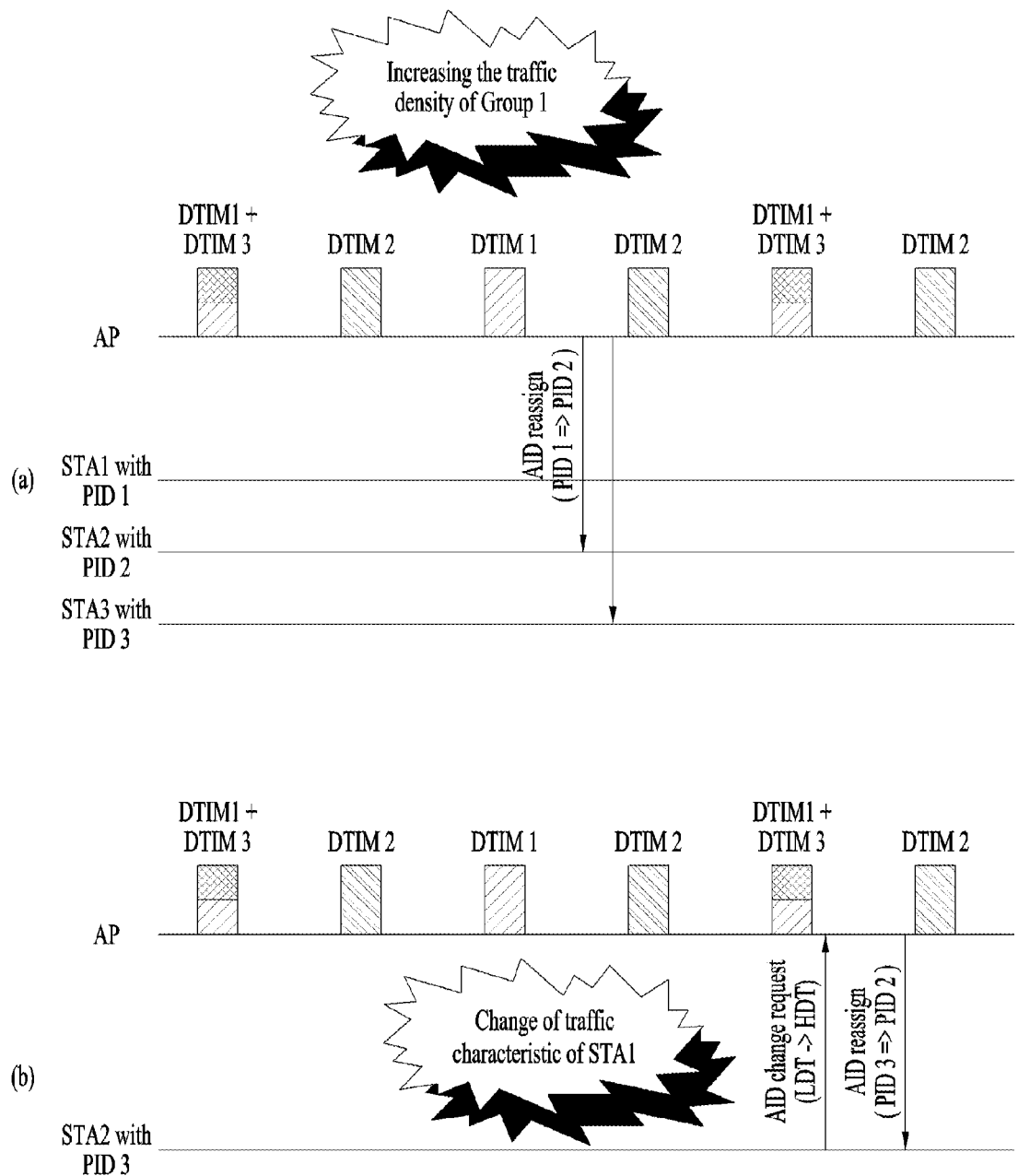

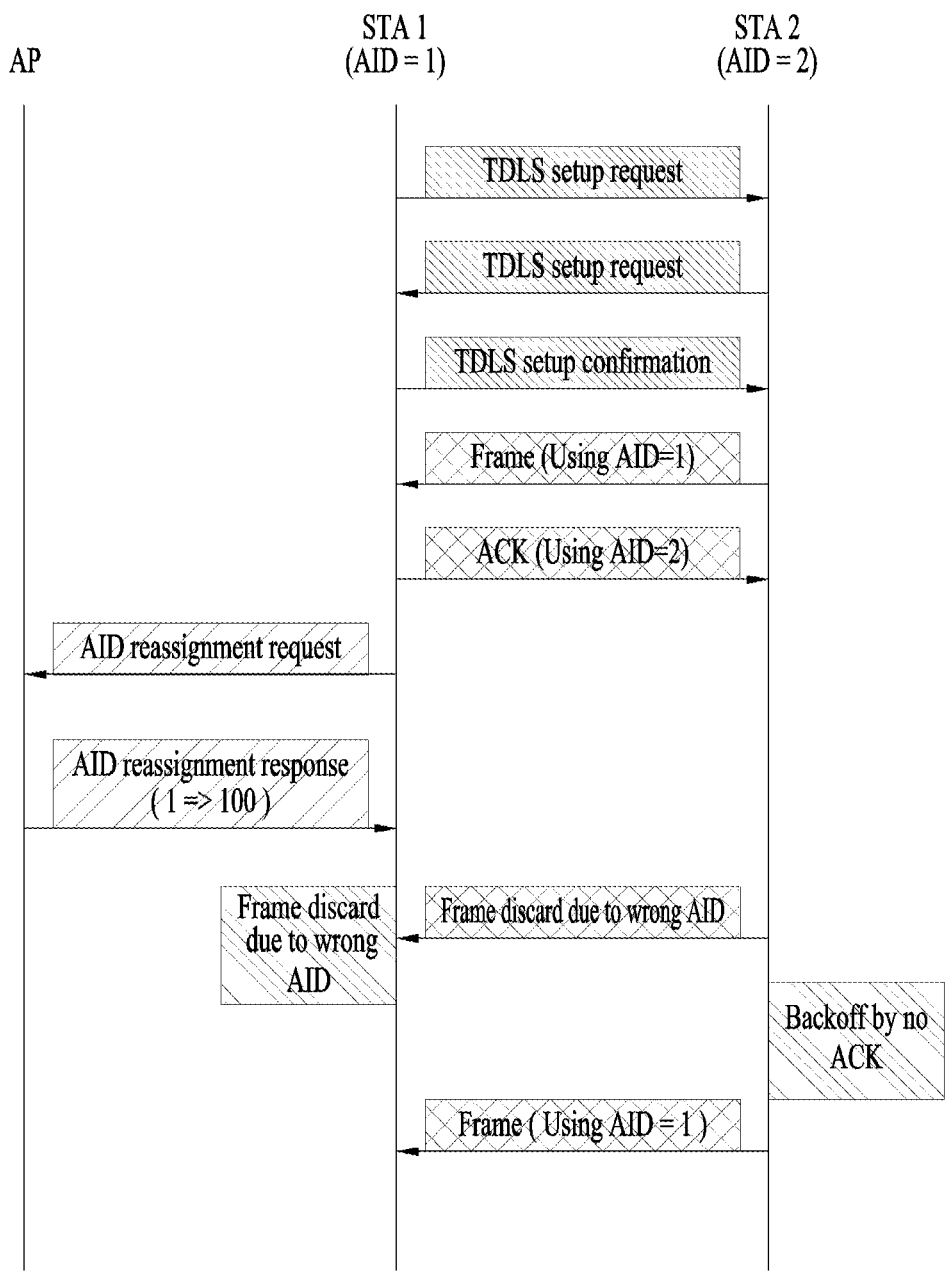

FIG. 30

| Order | Information |
|---|---|
| 1 | Category |
| 2 | SIG Action |
| 3 | AID Announcement Element |

(a)

| Category | Action | Dialog Token | Updated AID Information |
|---|---|---|---|
| 1 octet | 1 octet | 1 octet | TBD |

(b)

| Category | Action | Dialog Token | Reason | Updated AID Information |
|---|---|---|---|---|
| 1 octet | 1 octet | 1 octet | 1 octet | TBD |

One or more entries (a)

| Element ID | Length | AID Entry |
|---|---|---|

Octets: 1     1     8n (b)

| STA MAC Address | Association ID |
|---|---|

Octets: 6     2

FIG. 32

One or more entries (a)

| Element ID | Length | AID Entry Mode | AID Entry |
|---|---|---|---|

Octets: 1     1     1     2 or 8n (b)

| STA MAC Address | Association ID |
|---|---|

Octets: 0 or 6n     2n

FIG. 33

| Element ID | Length | STA's AID and STA'S MAC address |
|---|---|---|
| 1 octet | 1 octet | 2 ~ N octet |

FIG. 34

| Element ID | Length | Number of AID (N) | Old AIDs and New AIDs |
|---|---|---|---|
| 1 octet | 1 octet | 1 octet | 2 ~ 4 * N octet |

METHOD FOR TRANSMITTING/RECEIVING INFORMATION RELATED TO ASSOCIATION IDENTIFIER IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2013/011540, filed on Dec. 12, 2013, which claims the benefit of U.S. Provisional Application Nos. 61/736,017, filed on Dec. 12, 2012, 61/737,061, filed on Dec. 13, 2012, 61/761,229, filed on Feb. 5, 2013 and 61/811,100, filed on Apr. 11, 2013, the contents of which are all hereby incorporated by reference herein in their entirety.

TECHNICAL FIELD

The present invention relates to a wireless communication system and, more particularly, to a method and device for transmitting/receiving information related to an association identifier (AID) in a wireless local area network (WLAN) system.

BACKGROUND ART

With recent development of information communication technologies, a variety of wireless communication technologies have been developed. From among such technologies, WLAN is a technology that allows wireless access to the Internet at home, in businesses, or in specific service providing areas using a mobile terminal, such as a personal digital assistant (PDA), a laptop computer, and a portable multimedia player (PMP), based on radio frequency technology.

In order to overcome limited communication speed, which has been pointed out as a weak point of WLAN, technical standards have recently introduced a system capable of increasing the speed and reliability of a network while extending a coverage region of a wireless network. For example, IEEE 802.11n supports high throughput (HT) with a maximum data processing speed of 540 Mbps. In addition, Multiple Input and Multiple Output (MIMO) technology, which employs multiple antennas for both a transmitter and a receiver in order to minimize transmission errors and to optimize a data rate, has been introduced.

DISCLOSURE

Technical Problem

An object of the present invention devised to solve the problem lies in handling a direct link when an AID changes. Objects of the present invention are not limited to the aforementioned objects, and other objects of the present invention which are not mentioned above will become apparent to those having ordinary skill in the art upon examination of the following description.

Technical Solution

In a first aspect of the present invention, provided herein is a method for transmitting and receiving information related to an association identification (AID) in a wireless communication system, the method including receiving, by a second station (STA) having a direct link to a first STA, an announcement frame related to an updated AID from the first STA, and transmitting, by the second STA, an acknowledgement (ACK) frame in response to the announcement frame, wherein the announcement frame contains one or more AID-MAC address pairs, wherein the second STA updates an AID of an STA corresponding to the one or more AID-MAC address pairs.

The first aspect of the present invention may include the following details.

The announcement frame may contain an AID announcement element, wherein the AID announcement element may include the one or more AID-MAC address pairs.

An MAC address of the one or more AID-MAC address pairs may be an MAC address of an updated STA, and an AID of the one or more AID-MAC address pairs may be an AID of an STA corresponding to the MAC address.

The direct link may be one of tunneled direct link setup (TDLS) or direct link setup (DLS).

The updated AID may be a new AID assigned to the first STA by an access point (AP).

The new AID may be delivered from the AP to the first STA through an AID switch response frame.

When the updated AID belongs to a different group than an AID of the second STA, the announcement frame may contain information requesting change of the AID of the second STA.

In a second aspect of the present invention, provided herein is a method for transmitting and receiving information related to an association identification (AID) in a wireless communication system, the method including transmitting, by a first station (STA), an announcement frame related to an updated AID to the second STA having a direct link to the first STA, and receiving, by the first STA, an acknowledgement (ACK) frame from the second STA in response to the announcement frame, wherein the announcement frame contains one or more AID-MAC address pairs, wherein the one or more AID-MAC address pairs are used for update of an AID of an STA corresponding to the one or more AID-MAC address pairs by the second STA.

The second aspect of the present invention may include the following details.

The announcement frame may contain an AID announcement element, wherein the AID announcement element may include the one or more AID-MAC address pairs.

An MAC address of the one or more AID-MAC address pairs may be an MAC address of an updated STA, and an AID of the one or more AID-MAC address pairs may be an AID of an STA corresponding to the MAC address.

The method according to claim 8, wherein the direct link may be one of tunneled direct link setup (TDLS) or direct link setup (DLS).

The updated AID may be a new AID assigned to the first STA by an access point (AP).

The method may further include receiving, from the AP, a AID switch response frame containing the new AID.

The AID switch response frame may be a response to an AID switch request frame transmitted to the AP by the first STA.

Advantageous Effects

According to embodiments of the present invention, even if the AID of an STA changes, a direct link may be smoothly maintained. In addition, a processing time needed for AID update between STAs related to a direct link may be reduced.

Effects that can be obtained from the present invention are not limited to the aforementioned effects, and other effects may be clearly understood by those skilled in the art from the descriptions given below.

DESCRIPTION OF DRAWINGS

The accompanying drawings, which are intended to provide a further understanding of the present invention, illustrate various embodiments of the present invention and together with the descriptions in this specification serve to explain technical features of the invention.

FIG. 7 illustrates a format of an Action field.

FIG. 8 illustrates configuration of a TDLS frame.

FIG. 25 illustrates change of an AID of an STA in the same group, focusing on signaling.

FIG. 26 illustrates the structure of an AID assignment frame in the same group for changing AID of an STA in the same group.

FIG. 27 illustrates change of an AID of an STA belonging to a specific group to an AID of another group, focusing on signaling.

FIG. 28 illustrates a problem that may occur when an AID of an STA for which a direct link to another STA is set up changes.

FIGS. 29 to 43 illustrate a first embodiment of the present invention and variants thereof.

BEST MODE

Figure 1:
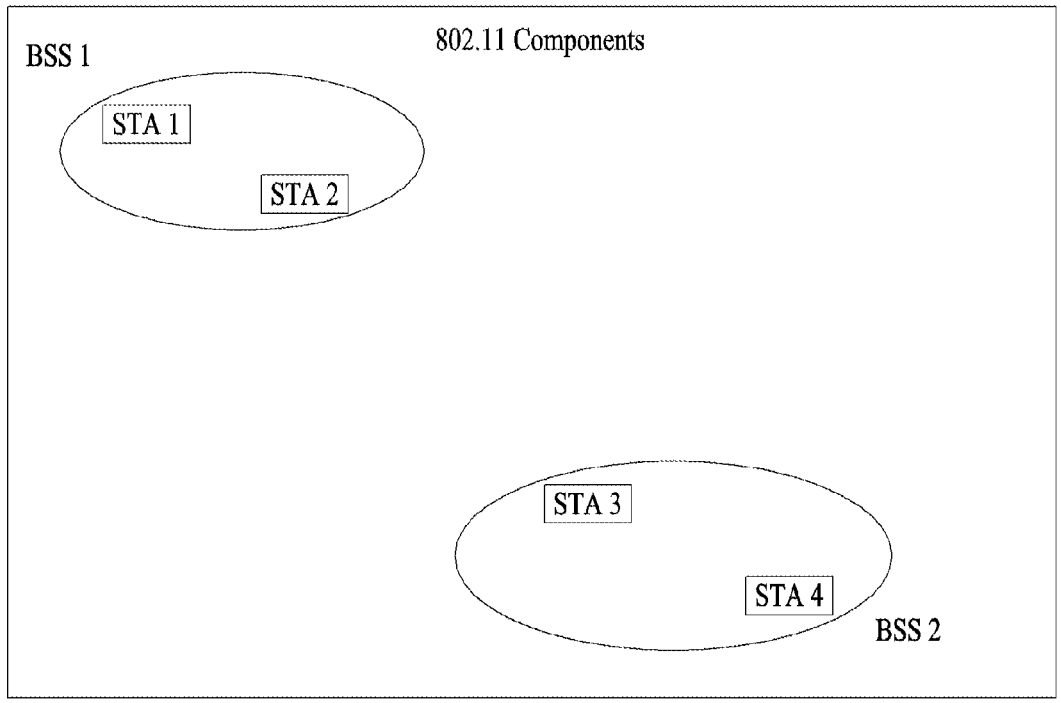
FIG. 1 is a diagram showing an exemplary structure of an IEEE 802.11 system to which the present invention is applicable.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to present only the embodiments that can be implemented according to the invention. The following detailed description includes specific details in order to provide a thorough understanding of the present invention. However, it will be apparent to those skilled in the art that the present invention may be practiced without such specific details.

In some cases, well-known structures and devices are omitted in order to avoid obscuring the concepts of the present invention and important functions of the structures and devices may be mainly illustrated in the form of block diagrams.

Specific terms are employed in the following descriptions for better understanding of the present invention. Such specific terms may take other forms within the technical scope or spirit of the present invention.

Exemplary embodiments of the present invention are supported by standard documents disclosed for at least one of an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system, which are wireless access systems. That is, steps or parts which are not described to clearly reveal the technical spirit of the present invention in the embodiments of the present invention may be supported by the above documents. All terminology used herein may be supported by at least one of the aforementioned documents.

The following embodiments of the present invention can be applied to a variety of wireless access technologies such as, for example, CDMA (Code Division Multiple Access), FDMA (Frequency Division Multiple Access), TDMA (Time Division Multiple Access), OFDMA (Orthogonal Frequency Division Multiple Access), and SC-FDMA (Single Carrier Frequency Division Multiple Access). CDMA may be embodied through a radio technology such as UTRA (Universal Terrestrial Radio Access) or CDMA2000. TDMA may be embodied through radio technologies such as GSM (Global System for Mobile communication)/GPRS (General Packet Radio Service)/EDGE (Enhanced Data Rates for GSM Evolution). OFDMA may be embodied through radio technologies such as IEEE 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution), which is a part of E-UMTS (Evolved UMTS) that uses E-UTRA, employs OFDMA in downlink and SC-FDMA in uplink. LTE-A (LTE-Advanced) is an evolved version of 3GPP LTE.

For clarity, the following description mainly focuses on IEEE 802.11 systems, but technical features of the present invention are not limited thereto.

Structure of WLAN System

FIG. 1 is a diagram showing an exemplary structure of an IEEE 802.11 system to which the present invention is applicable.

The structure of the IEEE 802.11 system may include a plurality of components. A WLAN which supports transparent station (STA) mobility for a higher layer may be provided by mutual operations of the components. A basic service set (BSS) may correspond to a basic building block in an IEEE 802.11 LAN. In FIG. 1, two BSSs (BSS1 and BSS2) are present and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in a corresponding BSS maintain communication. This area may be referred to as a basic service area (BSA). If an STA moves out of the BSA, the STA cannot directly communicate with the other STAs in the corresponding BSA.

In the IEEE 802.11 LAN, the most basic type of BSS is an independent BSS (IBSS). For example, the IBSS may have a minimum form consisting of only two STAs. The BSS (BSS1 or BSS2) of FIG. 1, which is the simplest form and does not include other components except for the STAs, may correspond to a typical example of the IBSS. This configuration is possible when STAs can directly communicate with each other. Such a type of LAN may be configured as necessary instead of being prescheduled and is also called an ad-hoc network.

Memberships of an STA in the BSS may be dynamically changed when the STA becomes an on or off state or the STA enters or leaves a region of the BSS. To become a member of the BSS, the STA may use a synchronization process to join the BSS. To access all services of a BSS infrastructure, the STA should be associated with the BSS. Such association may be dynamically configured and may include use of a distributed system service (DSS).

Figure 2:
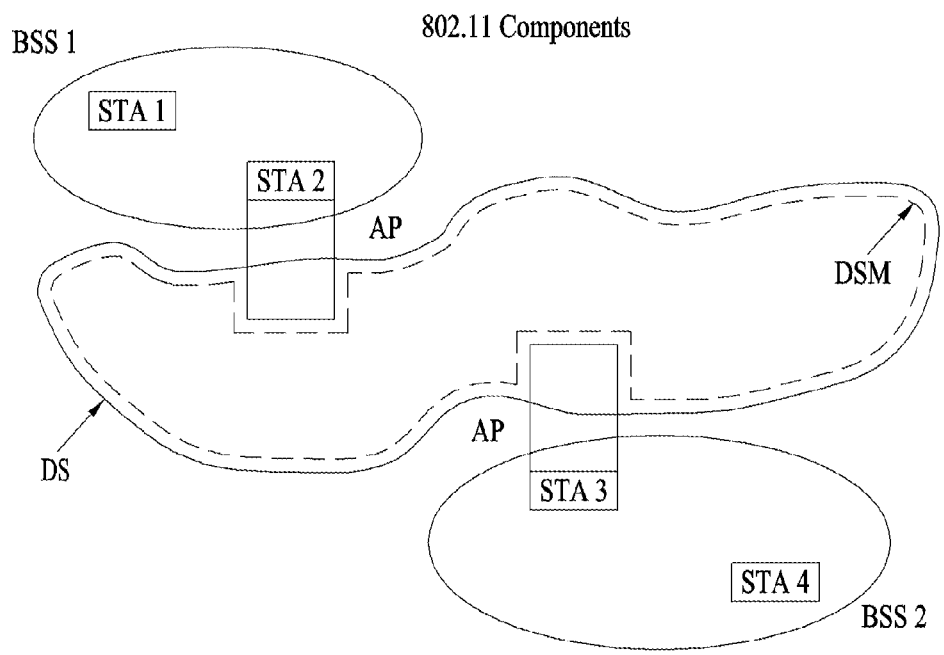
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be restricted by physical (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a wireless medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data can be moved between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not necessarily be identical to an address used by the AP for communication on the DSM.

Data transmitted from one of STAs associated with the AP to an STA address of the AP may be always received by an uncontrolled port and may be processed by an IEEE 802.1X port access entity. If the controlled port is authenticated, transmission data (or frame) may be transmitted to the DS.

Figure 3:
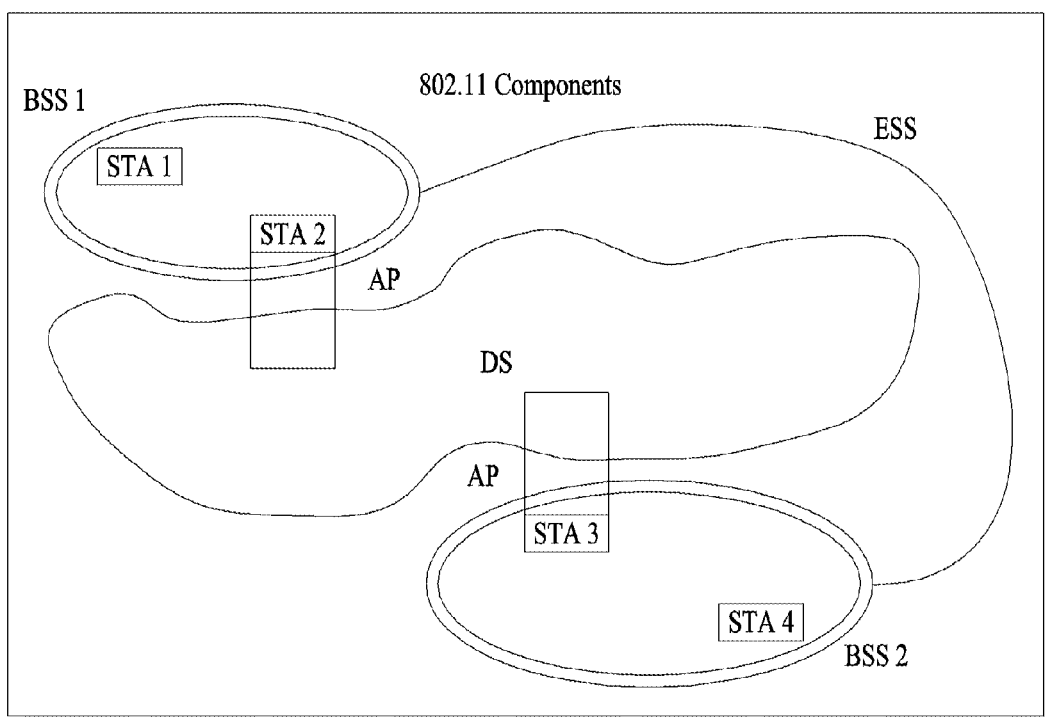
FIG. 3 is a diagram showing still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a logical link control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One (or more than one) IBSS or ESS networks may be physically located in the same space as one (or more than one) ESS network. This may correspond to an ESS network form in the case in which an ad-hoc network operates in a location in which an ESS network is present, the case in which IEEE 802.11 networks different organizations physically overlap, or the case in which two or more different access and security policies are necessary in the same location.

Figure 4:
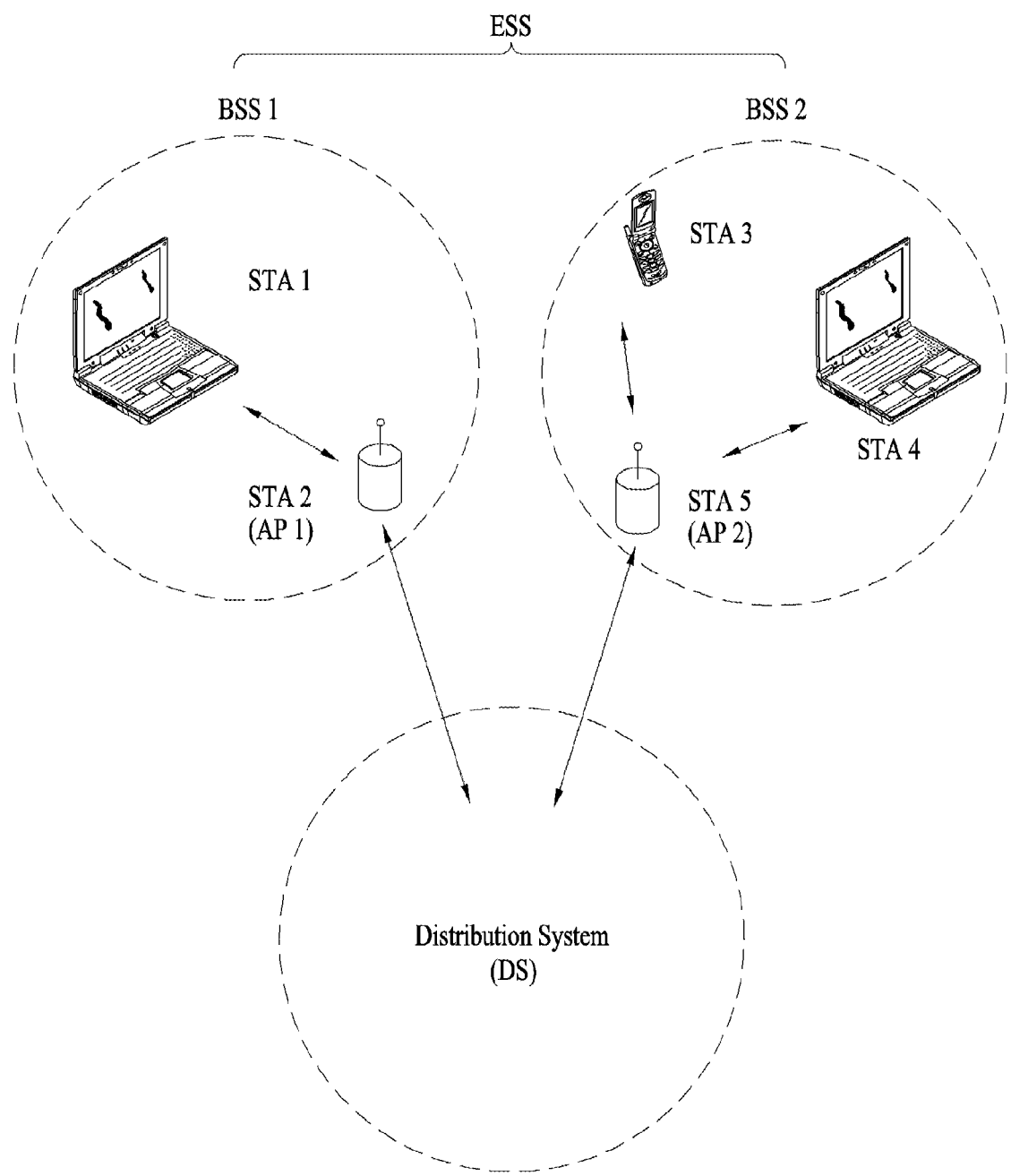
FIG. 4 is a diagram showing an exemplary structure of a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a wireless transmit/receive unit (WTRU), a user equipment (UE), a mobile station (MS), a mobile terminal, or a mobile subscriber station (MSS). The AP is a concept corresponding to a base station (BS), a Node-B, an evolved Node-B (eNB), a base transceiver system (BTS), or a femto BS in other wireless communication fields.

Figure 5:
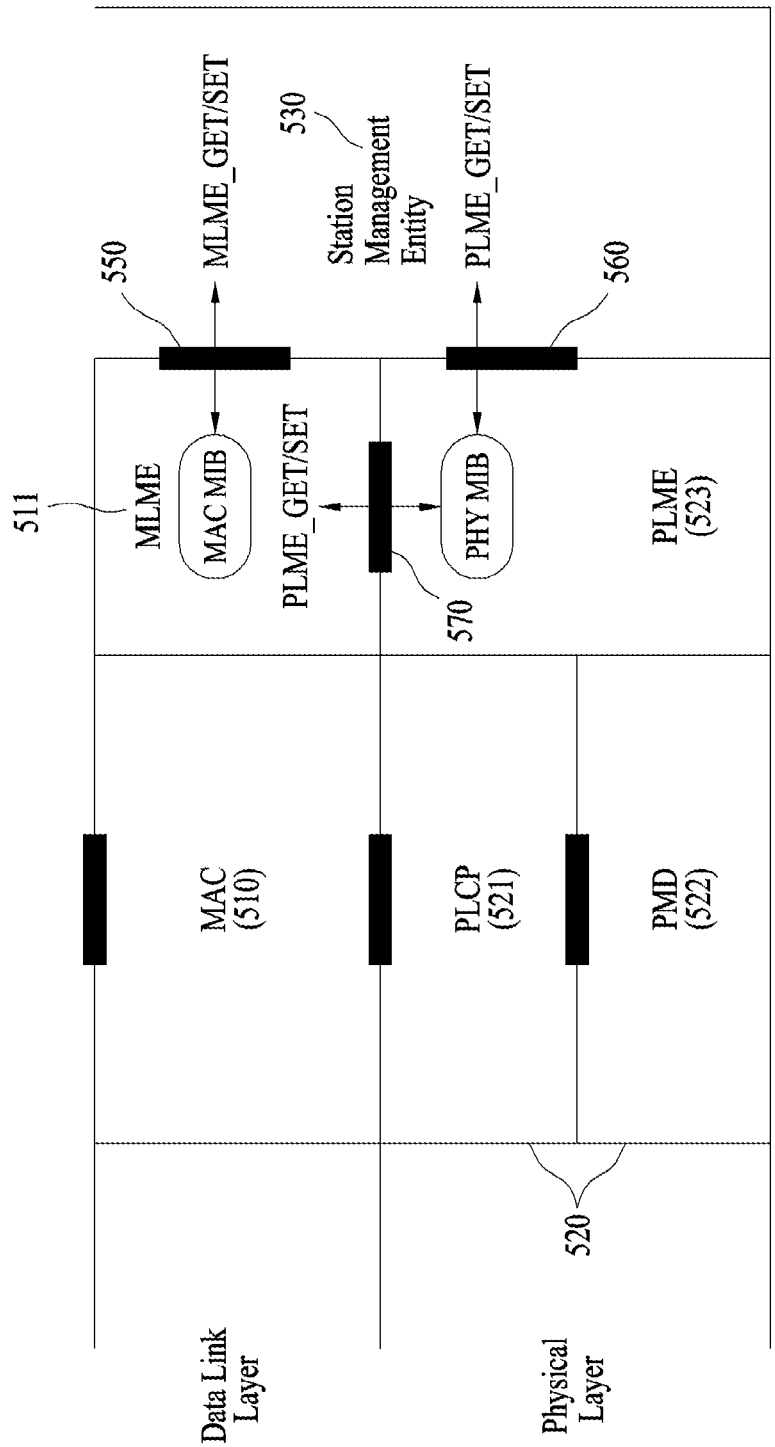
FIG. 5 is a diagram illustrating architectures of a data link layer and physical layer of an IEEE 802.11 system to which the present invention is applicable.

FIG. 5 is a diagram illustrating architectures of a data link layer and physical layer of an IEEE 802.11 system to which the present invention is applicable.

Referring to FIG. 5, a physical layer 520 may include a physical layer convergence procedure (PLCP) entity 521 and a physical medium dependent (PMD) entity, 522. The PLCP entity 521 functions to connect a MAC sublayer 510 and a data frame. The PMD entity 522 uses an OFDM scheme to transmit and receive data to and from two or more STAS.

Both the MAC sublayer 510 and the physical layer 520 may include a conceptual management entity. The conceptual management entities may be referred to as an MAC sublayer management entity (MLME) 511 and a physical layer management entity (PLME) 523, respectively. These entities 511 and 521 provide an layer management service interface through operation of a layer management function.

To provide accurate MAC operation, a station management entity (SME) 530 may exist in each STA. the SME 530 collects layer-based state information from multiple layer management entities or sets the values of specific parameters of each layer as a management entity independent from each layer. The SME 530 may perform the function of a general system management entity and implement a standard management protocol.

The various entity described above may interact in various ways. In FIG. 5, the entities exchange a GET/SET primitive. The XX-GET.request primitive is used to request a value of a management information base (MIB) attribute. If the state is "SUCCESS", the XX-GET.confirm primitive returns a corresponding value of the MIB attribute. Otherwise, the XX-GET.confirm primitive marks an error in the state field and returns the same. The XX-SET.request primitive is used to request that a designated MIB attribute be set to a give value. If the MIB attribute indicates a specific operation, the primitive request execution of the specific operation. In addition, if the state is "SUCCESS", the XX-SET.confirm primitive indicates that the designated MIB attribute is set to the requested value. Otherwise, the state field indicates occurrence of an error. If the MIB attribute indicates a specific operation, this primitive may confirm that the operation has been performed.

As shown in FIG. 5, the MLME 511 and SME 530, and the PLME 523 and SME 530 may exchange various primitives through a MLME_SAP (MLME_Service Access Point) 550 and a PLME_SAP (PLME_Service Access Point) 560, respectively. In addition, primitives may be exchanged between the MLME 511 and PLME 523 through an MLME-PLME_SAP (MLME-PLME_Service Access Point) 570.

Link Setup Process

Figure 6:
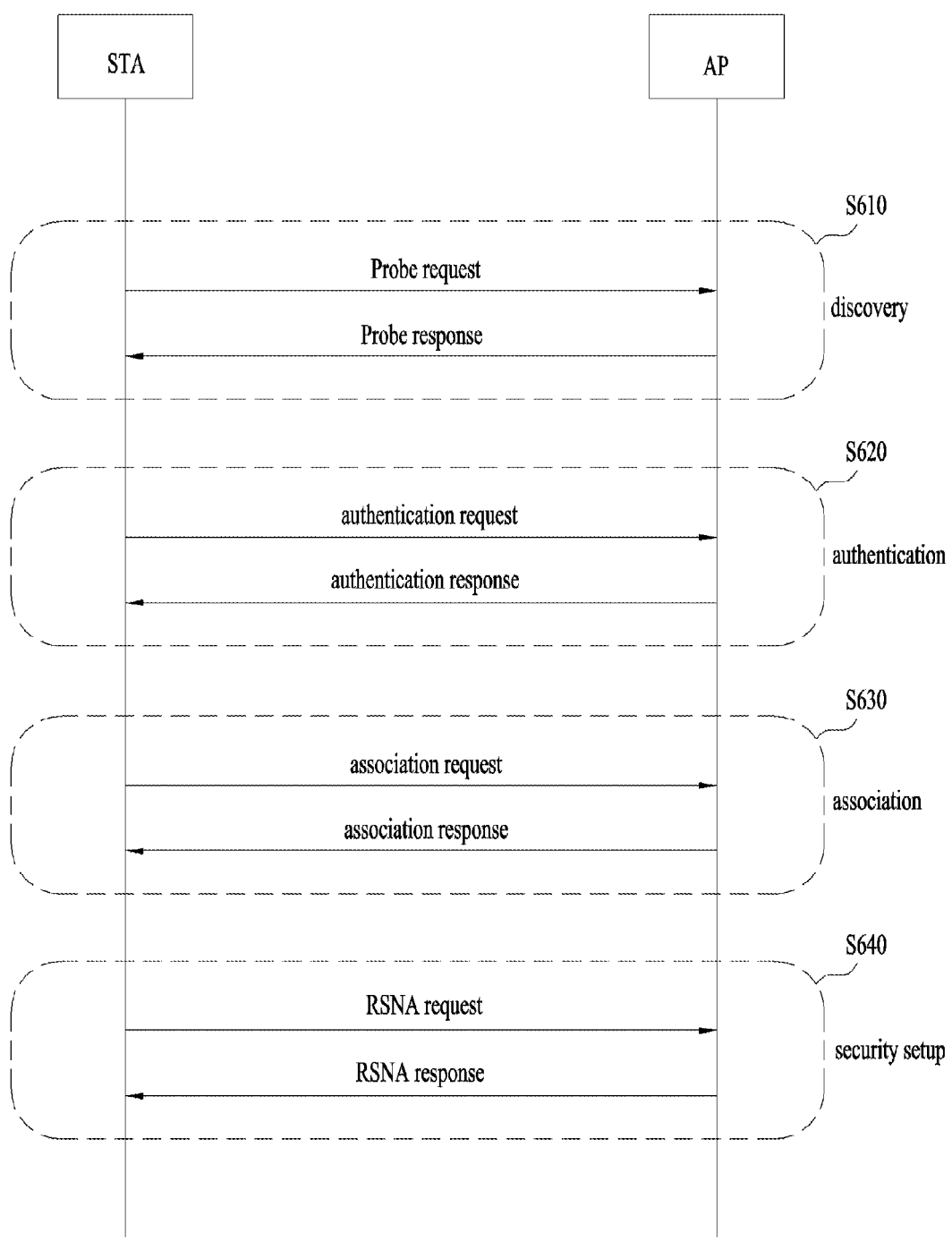
FIG. 6 is a diagram illustrating a normal link setup process in a WLAN system to which the present invention is applicable.

FIG. 6 illustrates a general link setup process in a WLAN system to which the present invention is applicable.

To establish link setup on the network and transmit/receive data over the network, the STA should perform network discovery and authentication, establish association, and perform an authentication procedure for security. The link setup process may also be referred to as a session initiation process or a session setup process. In addition, the discovery, authentication, association, and security setup steps in the link setup process may be collectively called an association step in a general sense.

Hereinafter, an exemplary link setup process will be described with reference to FIG. 6.

In step S610, the STA may perform the network discovery operation. The network discovery operation may include a scanning operation of the STA. That is, the STA needs to search for an available network so as to access the network. The STA needs to identify a compatible network before participating in a wireless network. Herein, the process of identifying the network contained in a specific region is referred to as scanning.

The scanning operation is classified into active scanning and passive scanning.

FIG. 6 exemplarily shows the network discovery operation including the active scanning process. In the case of the active scanning, the STA configured to perform scanning transmits a probe request frame and waits for a response to the probe request frame, in order to move between channels and search for APs present nearby. A responder transmits a probe response frame to the STA having transmitted the probe request frame, in response to the probe request frame. Herein, the responder may be the last STA that has transmitted a beacon frame in a BSS of the scanned channel. In the BSS, since the AP transmits a beacon frame, the AP serves as the responder. In the IBSS, STAs within the IBSS transmit a beacon frame in rotation, and thus the responder is fixed. For example, the STA that has transmitted the probe request frame on Channel #1 and has received the probe response frame on Channel #1 may store BSS-associated information contained in the received probe response frame and move to the next channel (for example, Channel #2) to perform scanning (i.e., transmission/reception of a probe request/response on Channel #2) in the same manner.

Although not shown in FIG. 6, the passive scanning operation may be carried out. In performing the passive scanning operation, an STA to perform scanning waits for a beacon frame by moving from one channel to another channel. The beacon frame, which is one of the management frames in IEEE 802.11, is periodically transmitted to indicate presence of a wireless network and allows the STA performing scanning to search for the wireless network and participate in the wireless network. In a BSS, the AP periodically transmits the beacon frame. In an IBSS, STAs of the IBSS transmit the beacon frame in rotation. If an STA performing scanning receives the beacon frame, the STA stores information about the BSS contained in the beacon frame, and then moves to another channel and records beacon frame information on each channel. The STA having received the beacon frame stores BSS-related information contained in the received beacon frame, moves to the next channel, and then performs scanning in the same manner as above.

Active scanning is more advantageous than passive scanning in terms of delay and power consumption.

After the STA discovers the network, the STA may perform authentication in step S620. This authentication process may be referred to as first authentication, which is clearly distinguished from the security setup operation of step S640, which will be described later.

The authentication process may include transmitting, by the STA, an authentication request frame to an AP and transmitting, by the AP, an authentication response frame to the STA in response to the authentication request frame. The authentication frame used for authentication request/response may correspond to a management frame.

The authentication frame may include information about an authentication algorithm number, an authentication transaction sequence number, a status code, a challenge text, a robust security network (RSN), a finite cyclic group, etc. This information, which is an example of information that may be contained in the authentication request/response frame, may be replaced with other information, or include additional information.

The STA may transmit an authentication request frame to the AP. The AP may determine whether to authenticate the STA on the basis of the information contained in the received authentication request frame. The AP may provide an authentication result to the STA through the authentication response frame.

After the STA is successfully authenticated, the association process may be conducted in step S630. The association process may include the steps of transmitting, by the STA, an association request frame to the AP and transmitting, by the AP, an association response frame to the STA in response.

For example, the association request frame may include information related to various capabilities, a beacon listen interval, a service set identifier (SSID), supported rates, supported channels, RSN, mobility domain, supported operating classes, a traffic indication map (TIM) broadcast request, an interworking service capability, etc.

For example, the association response frame may include information related to various capabilities, a status code, an association ID (AID), supported rates, an enhanced distributed channel access (EDCA) parameter set, a received channel power indicator (RCPI), a received signal to noise indicator (RSNI), mobility domain, a timeout interval (association comeback time), an overlapping BSS scan parameter, a TIM broadcast response, a QoS map, etc.

The aforementioned information, which corresponds to some parts of information which can be contained in the association request/response frame, may be replaced with other information or include additional information.

After the STA is successfully associated with the network, the security setup process may be performed in step S640. The security setup process of step S640 may be referred to as an authentication process based on a robust security network association (RSNA) request/response. The authentication process of step S620 may be referred to as a first authentication process, and the security setup process of Step S640 may be simply referred to as an authentication process.

The security setup process of Step S640 may include, for example, a private key setup process through 4-way handshaking based on an extensible authentication protocol over LAN (EAPOL) frame. In addition, the security setup process may also be performed in another security scheme which is not defined in IEEE 802.11 standards.

Direct Link Setup Process

To support direct link setup between STAs supporting QoS (hereinafter, referred to as "QSTAs"), QSTAs need to deliver management action frames such as DLS (Direct Link Setup) Setup Request, DLS Setup Response and DLS Teardown on their own without assistance from an AP Tunneled direct link setup (TDLS) is a technique of encapsulating and transmitting management action frames such as DLS Setup Request, DLS Setup Response and DLS Teardown. This technique may enable intelligent negotiation between STAs and reduction of network congestion.

The Action field provides a mechanism for explicitly indicating extended management actions. Details will be described below with reference to FIG. 7.

FIG. 7 illustrates a format of an Action field. As shown in FIG. 7, the Action field may include a Category field and an Action Details field (also referred to as "a TDLS Action field").

Some action frame formats are defined to support TDLS. The TDLS Action field located right after the Category field classify TDLS action frame formats. Values of the TDLS Action field related to respective frame formats within the TDLS category are exemplarily shown in Table 1 below.

TABLE 1

| TDLS Action field valud | Meaning |
| --- | --- |
| 0 | TDLS Setup Request |
| 1 | TDLS Setup Response |
| 2 | TDLS Setup Confirm |
| 3 | TDLS Teardown |
| 4 | TDLS Peer Traffic Indication |
| 5 | TDLS Channel Switch Request |
| 6 | TDLS Channel Switch Response |
| 7 | TDLS Peer PSM Request |
| 8 | TDLS Peer PSM Response |
| 9 | TDLS Peer Traffic Response |
| 10 | TDLS Discovery Request |
| 11-255 | Reserved |

FIG. 8 illustrates configuration of a TDLS frame. By assigning a new value to the Ether Type of the LLC/SNAP header shown in FIG. 8, it may be indicated that the data frame corresponds to a TDLS frame.

An exemplary configuration of the Payload Type field shown in FIG. 8 is shown in Table 2 below.

TABLE 2

| Protocol name | Payload type | Subclause |
| --- | --- | --- |
| Remote Request/Response | 1 | 12.10.3 (Remote Request/Response frame definition) |
| TDLS | 2 | 10.22.2 (TDLS payload) |
| Reserved | 3-255 | |

Figure 9:
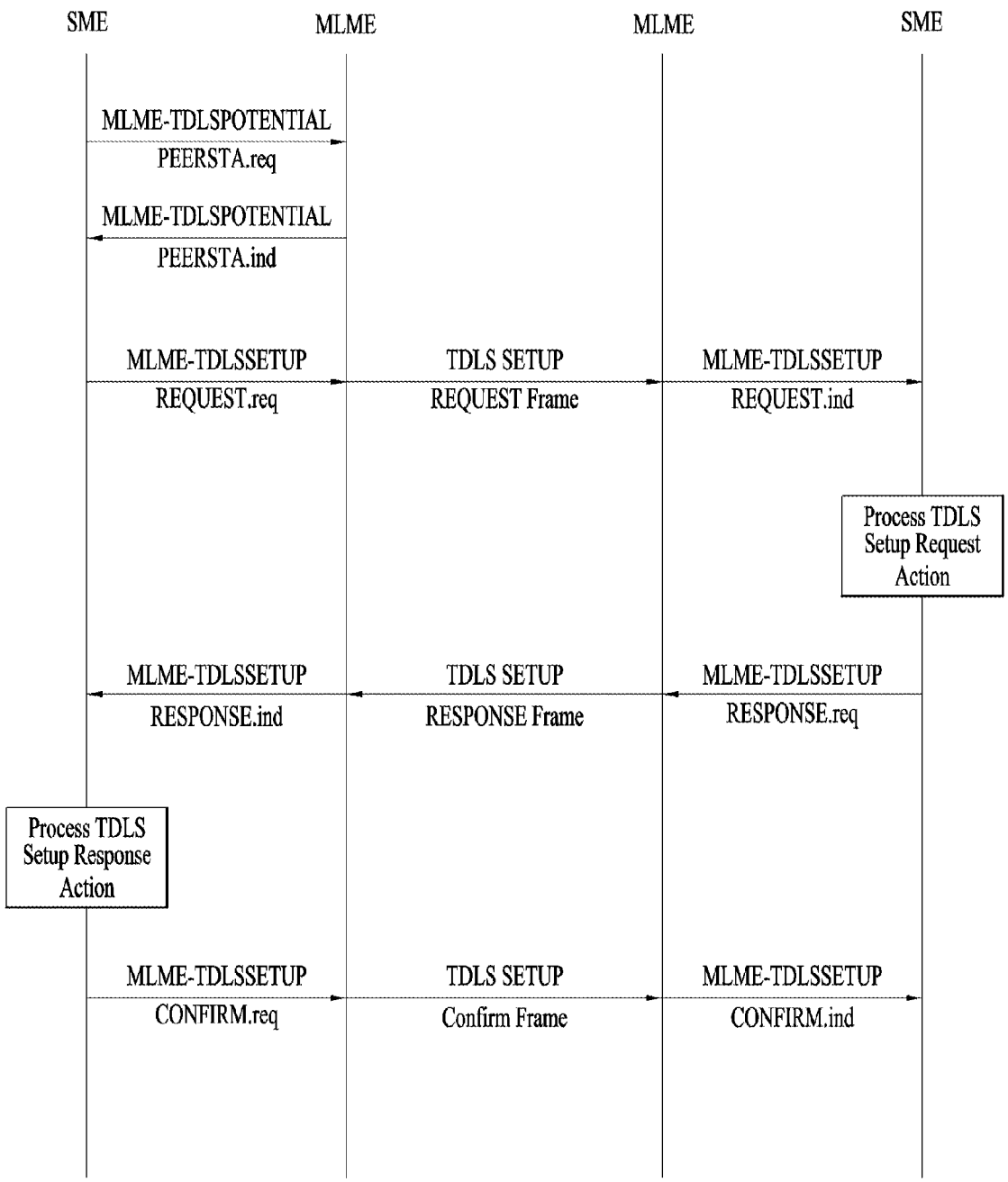
FIG. 9 illustrates a TDLS direct link setup process.

MLME primitives may support signaling of TDLS. FIG. 9 illustrates a TDLS direct link setup process. The process of FIG. 9 is merely an example of basic processes, and does not mean all usefulness of the protocol.

Evolution of WLAN

In order to overcome a limit in WLAN communication speed, IEEE 802.11n has recently been established as a communication standard. IEEE 802.11n aims to increase network speed and reliability as well as to extend a coverage region of the wireless network. More specifically, IEEE 802.11n supports a high throughput (HT) of a maximum data processing speed greater than or equal to 540 Mbps, and is based on multiple input and multiple output (MIMO) technology in which multiple antennas are used at both a transmitter and a receiver.

With widespread use of the WLAN technology and diversification of WLAN applications, there has been a need for development a new WLAN system capable of supporting higher HT than a data processing speed supported by IEEE 802.11n. The next generation WLAN system for supporting very high throughput (VHT) is the next version (for example, IEEE 802.11ac) of the IEEE 802.11n WLAN system, and is one of IEEE 802.11 WLAN systems recently proposed to support a data processing speed greater than or equal to 1 Gbps at an MAC service access point (MAC SAP).

In order to efficiently utilize a radio frequency channel, the next generation WLAN system supports a Multi User Multiple Input Multiple Output (MU-MIMO) transmission scheme in which a plurality of STAs can simultaneously access a channel. In accordance with the MU-MIMO transmission scheme, the AP may simultaneously transmit packets to at least one MIMO-paired STA. In addition, a technology for supporting WLAN system operations in whitespace has recently been discussed. For example, a technology for introducing the WLAN system in TV whitespace (TV WS) such as a frequency band (e.g., a band between 54 MHz and 698 MHz) left idle due to transition from analog TV to digital TV has been discussed under the IEEE 802.11af standard. However, this is simply illustrative, and the whitespace may be viewed as a licensed band which is primarily usable by a licensed user. The licensed user means a user who has permission to use the licensed band, and may also be referred to as a licensed device, a primary user, an incumbent user, or the like.

For example, an AP and/or STA operating in the whitespace (WS) should provide a function of protecting the licensed user. For example, in the case in which a licensed user such as a microphone is already using a specific WS channel which is in a frequency band divided according to a regulation so as to have a specific bandwidth in the WS band, the AP and/or STA are not allowed to use the frequency band corresponding to the WS channel in order to protect the licensed user. In addition, the AP and/or STA should stop using a frequency band for transmission and/or reception of a current frame when the licensed user uses this frequency band.

Accordingly, the AP and/or STA needs to pre-check whether use of a specific frequency band within the WS band is possible, namely whether a licensed user is in the frequency band. Checking whether a licensed user is in the specific frequency band is referred to as spectrum sensing. An energy detection scheme, a signature detection scheme and the like are utilized as the spectrum sensing mechanisms. The AP and/or STA may determine that a licensed user is using the specific frequency band if the intensity of a received signal exceeds a predetermined value, or when a DTV preamble is detected.

Machine-to-machine (M2M) communication technology has been discussed as a next generation communication technology. Technical standard IEEE 802.11ah to support M2M communication in the IEEE 802.11 WLAN system is also under development. M2M communication, which represents a communication scheme involving one or more machines, may also be referred to as machine type communication (MTC) or machine-to-machine (M2M) communication. Herein, the machine may represent an entity that does not require direct manipulation from or intervention of a user. For example, not only a meter or vending machine equipped with a wireless communication module, but also user equipment such as a smartphone which is capable of performing communication by automatically accessing the network without manipulation/intervention by the user may be an example of the machines. M2M communication may include device-to-device (D2D) communication and communication between a device and an application server. As an example of communication between a device and an application server, communication between a vending machine and an application server, communication between a Point of Sale (POS) device and an application server, and communication between an electric meter, a gas meter or a water meter and an application server. M2M communication-based applications may include security, transportation and healthcare applications. Considering the characteristics of the aforementioned application examples, M2M communication needs to support occasional transmission/reception of a small amount of data at a low speed in an environment including a large number of devices.

Specifically, M2M communication needs to support a large number of STAs. While the current WLAN system assumes that one AP is associated with up to 2007 STAs, various methods to support other cases in which many more STAs (e.g., about 6000 STAs) are associated with one AP have been discussed regarding M2M communication. In addition, it is expected that there will be many applications to support/require a low transfer rate in M2M communication. In order to smoothly support many STAs, an STA in the WLAN system may recognize presence or absence of data to be transmitted thereto on the basis of a traffic indication map (TIM), and several methods to reduce the bitmap size of the TIM have been under discussion. In addition, it is expected that there will be much traffic data having a very long transmission/reception interval in M2M communication. For example, in M2M communication, a very small amount of data such as electric/gas/water metering is required to be transmitted and received at long intervals (for example, every month). Accordingly, there have been discussions about methods to efficiently support the case in which a very small number of STAs have a data frame to receive from the AP during one beacon period while the number of STAs to be associated with one AP increases in the WLAN system.

As described above, WLAN technology is rapidly evolving, and not only the aforementioned exemplary techniques but also other techniques for direct link setup, improvement of media streaming throughput, support of high-speed and/or large-scale initial session setup, and support of an extended bandwidth and operation frequency are under development.

Frame Structure

Figure 10:
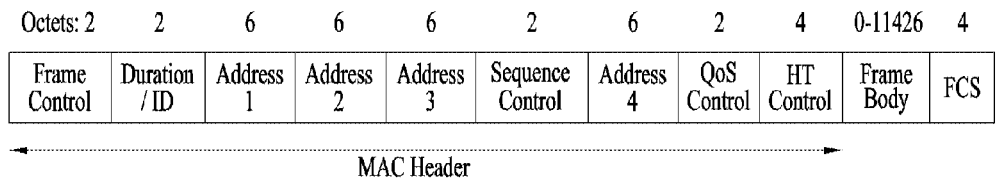
FIG. 10 exemplarily shows a MAC frame format of an IEEE 802.11 system to which the present invention is applicable.

FIG. 10 exemplarily shows a MAC frame format of an IEEE 802.11 system to which the present invention is applicable.

Referring to FIG. 10, a MAC frame format includes a MAC header (MHR), a MAC payload, and a MAC footer (MFR). The MHR includes a frame control field, a duration/ID field, an Address 1 field, an Address 2 field, an Address 3 field, a sequence control field, an Address 4 field, a quality of service (QoS) Control field, and an HT Control field. The Frame Body field, defined by the MAC payload, has data to be transmitted in a higher layer, and has a variable size. The frame check sequence (FCS) field is defined by the MAC footer and is used to search for an error of the MAC frame.

The first three fields (the frame control field, the duration/ID field and the Address 1 field), and the last field (the FCS field) constitute a minimal frame format, and are present in all frames. The other fields may be present only in a specific frame type.

Information contained in each of the aforementioned fields may comply with the definition of the IEEE 802.11 system. In addition, each of the aforementioned fields may be an example of fields which may be included in a MAC frame, and may be replaced with another field or include an additional field.

Figure 11:
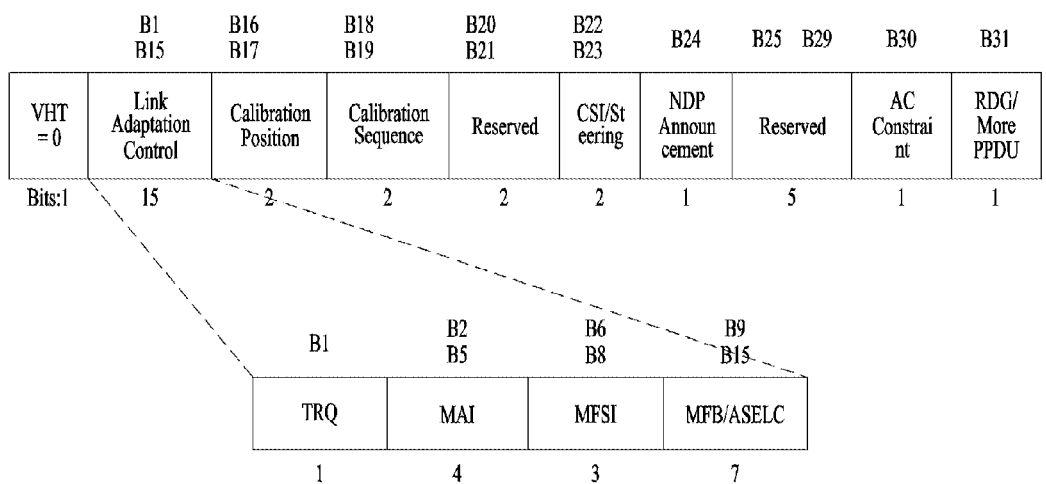
FIG. 11 exemplarily shows an HT format of the HT Control field in the MAC frame of FIG. 10.

FIG. 11 exemplarily shows an HT format of the HT Control field in the MAC frame of FIG. 10.

Referring to FIG. 11, the HT Control field may include a VHT subfield, a Link Adaptation subfield, a Calibration Position subfield, a Calibration Sequence field, a CSI (Channel State Information)/Steering subfield, an NDP (Null Data Packet) Announcement field, an AC (Access Category) Constraint subfield, and an RDG (Reverse Direction Grant)/More PPDU subfield, and a Reserved subfield.

The Link Adaptation subfield may include a TRQ (Training Request) subfield, an MAI (MCS (Modulation and Coding Scheme) Request or ASEL (Antenna Selection) Indication) subfield, an MFSI (MCS Feedback Sequence Identifier) subfield, and an MFB/ASELC (MCS Feedback and Antenna Selection Command/data) subfield.

The TRQ subfield is set to 1 when a request for transmission of a sounding PPDU is made to a responder, and is set to 0 when a request for transmission of the sounding PPDU is not made to the responder. When the MAI subfield is set to 14, it represents ASEL indication, and the MFB/ASELC subfield is interpreted as the antenna selection command/data. Otherwise, the MAI subfield represents an MCS request, and the MFB/ASELC subfield is interpreted as the MCS feedback. In the case in which the MAI subfield represents the MCS request (MRQ), the subfield is set to 0 when no MCS feedback is requested and is set to 1 when an MCS feedback is requested. The sounding PPDU, which may be used for channel estimation, represents a PPDU for transmitting a training symbol.

Each of the aforementioned subfields, which are examples of subfields that can be included in the HT Control field, may be replaced with another subfield or include an additional subfield.

Figure 12:
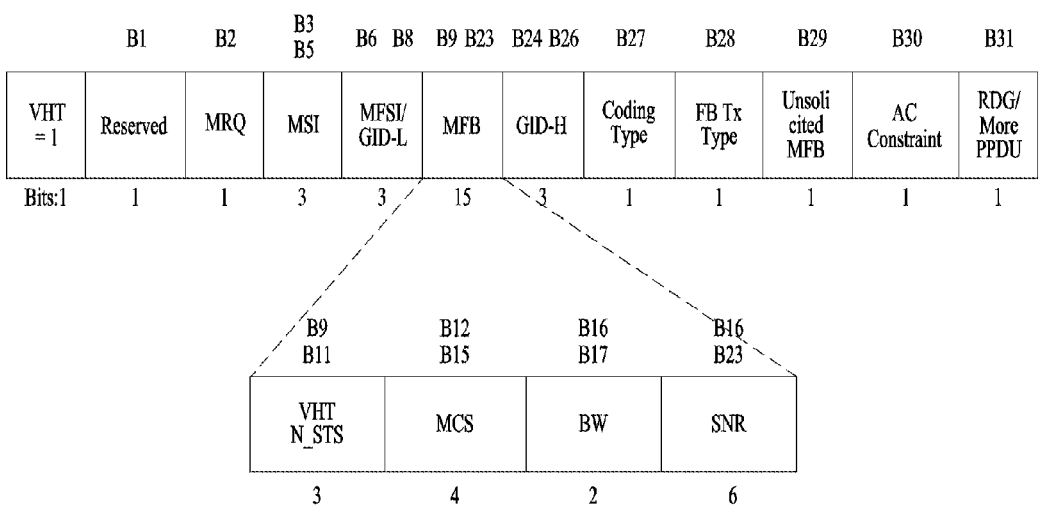
FIG. 12 exemplarily shows a VHT format of the HT Control field in the MAC frame of FIG. 10.

FIG. 12 exemplarily shows a VHT format of the HT Control field in the MAC frame of FIG. 10.

Referring to FIG. 12, the HT Control field may include a VHT subfield, an MRQ subfield, an MSI subfield, an MFSI/GID-L (MCS Feedback Sequence Indication/LSB of Group ID) subfield, an MFB subfield, a GID-H (MSB of Group ID) subfield, a Coding Type subfield, an FB Tx Type (Transmission type of MFB response) subfield, an Unsolicited MFB subfield, an AC Constraint subfield, and an RDG/More PPDU subfield. In addition, the MFB subfield may include a VHT N_STS (Number of Space Time Streams) subfield, MCS subfield, a BW (Bandwidth) subfield, and an SNR (Signal to Noise Ratio) subfield.

Table 3 provides descriptions of the respective subfields in the VHT format of the HT Control field.

TABLE 3

| Subfield | Meaning | Definition |
| --- | --- | --- |
| MRQ | MCS request | Set to 1 if the MCS feedback (solicited MFB) is requested. Otherwise, the subfield is set to 0. |
| MSI | MRQ sequence identifier | If the MRQ subfield is set to 1, the MSI subfield includes a sequence number for identifying a specific request between 0 and 6. If the MRQ subfield is set to 0, the MSI subfield is reserved. |
| MFSI/GID-L | MFB sequence identifier/LSB of Group ID | If the unsolicited MFB subfield is set to 0, the MFSI/GID-L subfield includes a received value of the MSI included in a frame indicated by the MFB information. If the unsolicited MFB subfield is set to 1, the MFSI/GID-L subfield includes three least significant bits of Group ID of the PPDU indicated by the unsolicited MFB. |
| MFB | VHT N_STS, MCS, BW, SNR feedback | The MFB subfield includes a recommended MFB. If MCS = 15 and VHT N_STS = 7, this indicates that feedback is not present. |
| GID-H | MSB of Group ID | If the unsolicited MFB subfield is set to 1, the GID-H subfield includes three most significant bits of Group ID of the PPDU indicated by the unsolicited MFB. |
| Coding Type | Coding type of MFB response | If the unsolicited MFB subfield is set to 1, the Coding Type subfield contains coding information (1 for a binary convolutional code (BCC) and 0 for a low-density parity check (LDPC)) indicated by the unsolicited MFB. Otherwise, it is reserved. |
| FB Tx Type | Transmission type of MFB response | If the unsolicited MFB subfield is set to 1, and the FB Tx Type subfield is set to 0, the unsolicited MFB indicates one of transmission diversities using an unbeamformed VHT PPDU or an STBC (space-time block coding) VHT PPDU. If unsolicited MFB subfield is set to 1, and the FB Tx Type subfield is set to 1, the unsolicited MFB indicates the beamformed SU-MIMO (Single User MIMO) VHT PPDU. Otherwise, it is reserved. |
| Unsolicited MFB | Unsolicited MCS feedback indicator | If the MFB is not a response to the MRQ, this subfield is set to 1. If the MFB is a response to the MRQ, this subfield is set to 0. |
| AC Constraint | | If a response to the RDG includes a data frame from a certain traffic identifier (TID), this subfield is set to 0. If the response to the RDG includes only a frame from the same AC as that of the last data frame received from the same reverse direction (RD) initiator, this subfield is set to 1. |
| RDG/More PPDU | | The RDG/More PPDU subfield set to 0 indicates that there is no RDG if the RD initiator is transmitted, and indicates that the PPDU transmitting the MAC frame is the final transmission if an RD responder is transmitted. The RDG/More PPDU subfield set to 1 indicates that there is an RDG if the RD initiator is transmitted, and indicates that another PPDU follows the PPDU transmitting the MAC frame, if the responder is transmitted. |

Each of the aforementioned subfields, which are examples of subfields that can be included in the HT Control field, may be replaced with another subfield or include an additional subfield.

Meanwhile, the MAC sublayer transfers a MAC protocol data unit (MPDU) to a physical layer (PHY) as a PHY service data unit (PSDU). The PLCP entity adds a PHY header and a preamble to the received PSDU to create a PLCP protocol data unit (PPDU).

Figure 13:
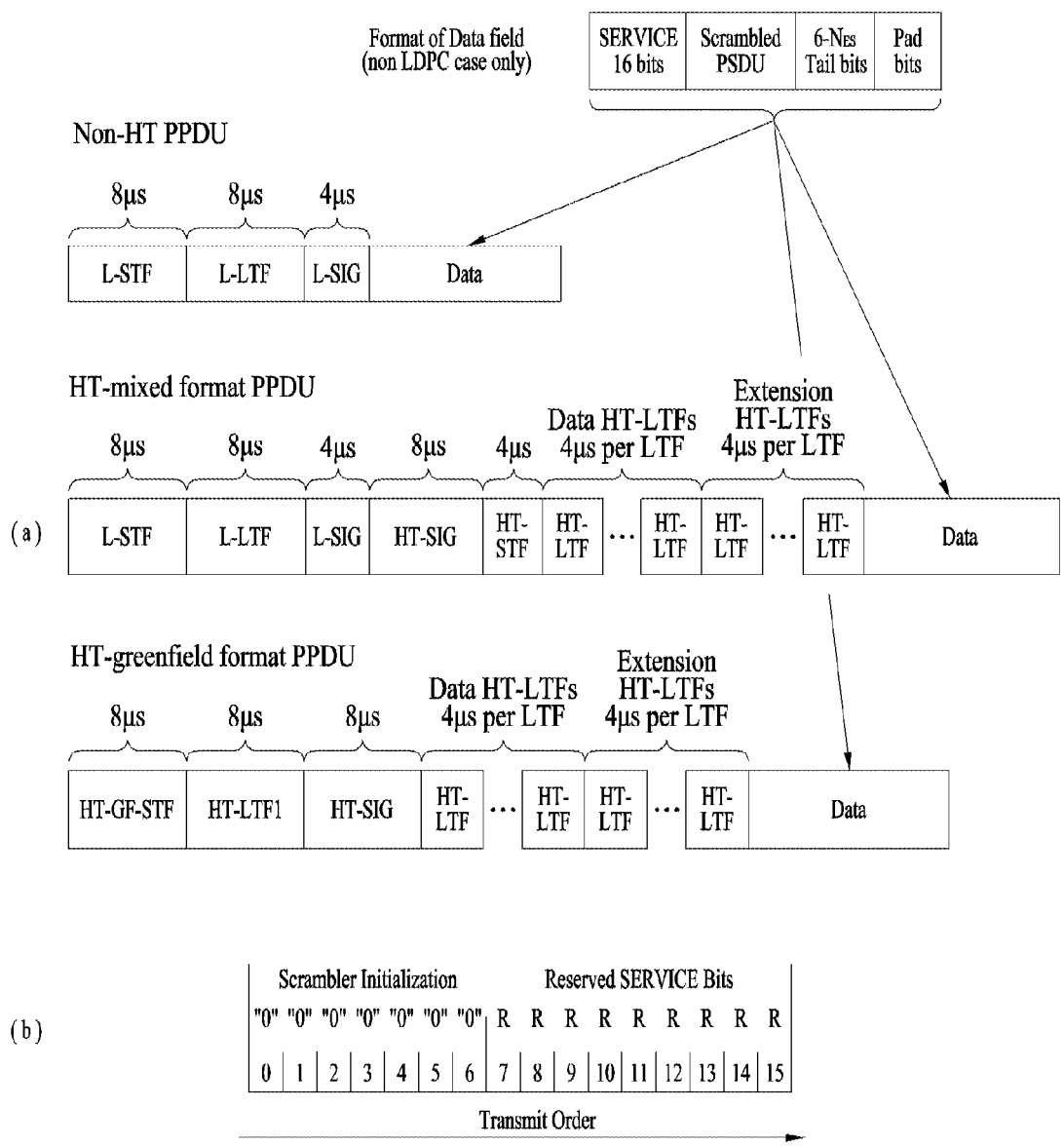
FIG. 13 illustrates a PPDU frame format of an IEEE 802.11n system to which the present invention is applicable.

FIG. 13 exemplarily shows PPDU frame formats of an IEEE 802.11n system to which the present invention is applicable.

FIG. 13(a) exemplarily shows PPDU frames according to a Non-HT format, an HT-mixed format, and an HT-Greenfield format.

The Non-HT format represents a frame format for STAs of a conventional legacy system (IEEE 802.11 a/g). A Non-HT format PPDU includes a legacy format preamble configured with an L-STF (Legacy-Short Training field), an L-LTF (Legacy-Long Training field), and an L-SIG (Legacy-Signal) field.

The HT-mixed format allows STAs of a conventional legacy system to perform communication, and at the same time represents a frame format for STAs of IEEE 802.11n. An HT-mixed format PPDU includes a legacy format preamble including an L-STF, an L-LTF and an L-SIG, and an HT format preamble including an HT-short training field (HT-STF), an HT-long training field (HT-LTF) and an HT-signal (HT-SIG) field. Since the L-STF, L-LTF and L-SIG represent legacy fields for backward compatibility, the L-STF, L-LTF and L-SIG are identical to those of the Non-HT format, and an STA may recognize the mixed format PPDU based on the HT-SIG field following these fields.

The HT-Greenfield format, which is not compatible with the conventional legacy system, represents a frame format for STAs of IEEE 802.11n. The HT-Greenfield format PPDU includes a Greenfield preamble configured with an HT-GF-STF (HT-Greenfield-STF), an HT-LTF1, an HT-SIG, and at least one HT-LTF.

The Data field includes a SERVICE field, a PSDU, tail bits, and pad bits. All the bits of the Data field are scrambled.

FIG. 13(b) shows the SERVICE field included in the Data field. The Service field has 16 bits. Numbers from 0 to 15 are assigned to the bits respectively, and the bits are sequentially transmitted from bit #0. The bits from bit #0 to bit #6 are set to 0 and used to synchronize the descrambler in the receiver.

Figure 14:
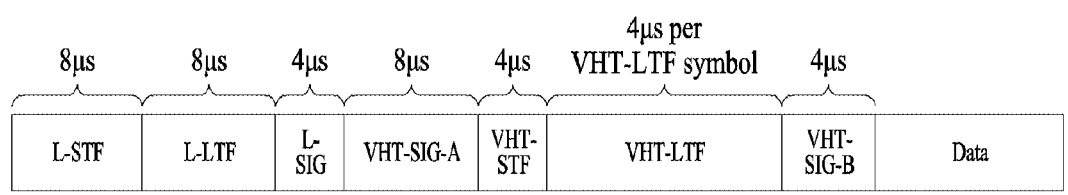
FIG. 14 exemplarily shows a VHT PPDU frame format of an IEEE 802.11ac system to which the present invention is applicable.

FIG. 14 exemplarily shows a VHT PPDU frame format of an IEEE 802.11ac system to which the present invention is applicable.

Referring to FIG. 14, a VHT format PPDU includes a legacy format preamble, which is ahead of the Data field and includes an L-STF, an L-LTF, and L-SIG, and a VHT format preamble, which includes a VHT-SIG-A, an HT-STF and an HT-LTF. Since the L-STF, L-LTF and L-SIG represent legacy fields for backward compatibility, the fields from the L-STF to the L-SIG are identical to those of the Non-HT format, and an STA may identify the VHT format PPDU using the VHT-SIG field subsequent to these fields.

The L-STF is a field for frame detection, auto gain control (AGC), diversity detection, coarse frequency/time synchronization, and the like. The L-LTF is a field for fine frequency/time synchronization, channel estimation, and the like. The L-SIG is a field for transmission of legacy control information. The VHT-SIG-A is a VHT field for transmission of control information shared by the VHT STAs. The VHT-STF is a field for AGC for MIMO and beamformed streams. The VHT-LTF is a field for channel estimation for MIMO and beamformed streams. The VHT-SIG-B is a field for transmission of STA-specified control information.

Figure 15:
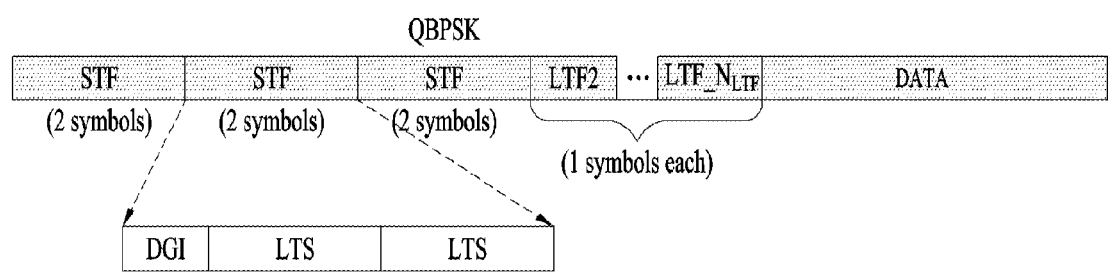
FIG. 15 illustrates a typical frame format for a single user (SU) open-loop packet of an IEEE 802.11 system to which the present invention is applicable.

FIG. 15 illustrates a typical frame format for a single user (SU) open-loop packet of an IEEE 802.11 system to which the present invention is applicable. The structure of a typical frame format for a SU open-loop packet is similar to that of the green field preamble of an IEEE 802.11n system. Specifically, referring to FIG. 15, the frame format for the SU open-loop packet includes STF, LTF1, SIG, one or more LTFs and a Data field.

The STF field uses the same tones (i.e., each 2 MHz) as defined in IEEE 802.11n. The STF uses 12 non-zero tones. The non-zero tones are mapped to space-time streams using the first column of a matrix P in the same manner as the IEEE 802.11n GF preamble.

The LTF field occupies more than 2 MHz and has the same FFT size as a VHTLTF signal corresponding to an IEEE 802.11ac packet.

The SIG field uses two symbols modulated with Q-BPSK as in the case of the Green field preamble of IEEE 802.11n. Each of 48 data tones occupies a subband within 2 MHz, and is modulated using IEEE 802.11n or IEEE 802.11ac MCS0. The multiple data tones are mapped to multiple space-time streams using the first column of a matrix P in the same manner as the IEEE 802.11n GF preamble.

Content of the SIG field occupying 2 MHz or more may be divided into SIGA and SIGB. While SIGA may be used in both the SU environment and a multi user (MU) environment, SIGB may be used only in the MU environment.

The structure of SIGA may be changed through division between SU and MU by autodetection. Table 4 shows the size of each field in SIGA in the SU and MU environments.

TABLE 4

| Field of SIG | SU (Bits) | MU (Bits) |
| --- | --- | --- |
| Length/Duration | 9 | 9 |
| MCS | 4 | |
| BW | 2 | 2 |
| Aggregation | 1 | |
| STBC | 1 | 1 |
| Coding | 2 | 5 |
| SGI | 1 | 1 |
| GID | | 6 |
| Nsts | 2 | 8 |
| PAID | 9 | |
| Ack Indication | 2 | 2 |
| Reserved | 5 | 4 |
| CRC | 4 | 4 |
| Tail | 6 | 6 |
| Total | 48 | 48 |

The Length/Duration field has a size in symbols when Aggregation is 1 (ON), and has a size in bytes when Aggregation is 0 (OFF), when the packet size of Mandate AMPDU (aggregated MAC protocol data unit) is greater than 511 bytes and when an MU environment is given.

Nsts represents 1 STS to 4 STSs in 2 bits in an SU environment, and represents 0 to 3 STSs in 8 bits for each user in an MU environment.

The Coding indicates BCC/LDPC with 1 bit in the SU environment and indicats an additional symbol with another bit during the LDPC encoding process. The Coding indicates BCC/LDPC of 4 clients in 4 bits in the MU environment as in the case of IEEE 802.11ac, and indicates, to an arbitrary user, whether or not an additional symbol is generated when LDPC is encoded in 1 bit.

MCS is a 4-bit index in the SU environment. In the MU environment, the MCS reuses 3 bits as a BCC/LDCP indicator for 2 to 4 users, similar to VHTSIGA of IEEE 802.11 ac.

Aggregation may be mainly applied in the SU environment and may be reserved in the MU environment.

CRC may be sufficiently implemented with 4 bits.

GID may be used in 6 bits in the MU environment, but is not needed in the SU environment.

PAID, which has a size of 9 bits, is not needed in the MU environment.

2 bits may be assigned to Ack Indication.

Table 5 shows the size of each field in SIGB according to bandwidths (BWs).

TABLE 5

| Field of SIG | Bits | | | |
|---|---|---|---|---|
| | BW: 2 MHz | BW: 4 MHz | BW: 8 MHz | BW: 16 MHz |
| MCS | 4 | 4 | 4 | 4 |
| Tail | 6 | 6 | 6 | 6 |
| CRC | 8 | 8 | 8 | 8 |
| Reserved | 8 | 9 | 11 | 11 |
| Total | 26 | 27 | 29 | 29 |

Figure 16:
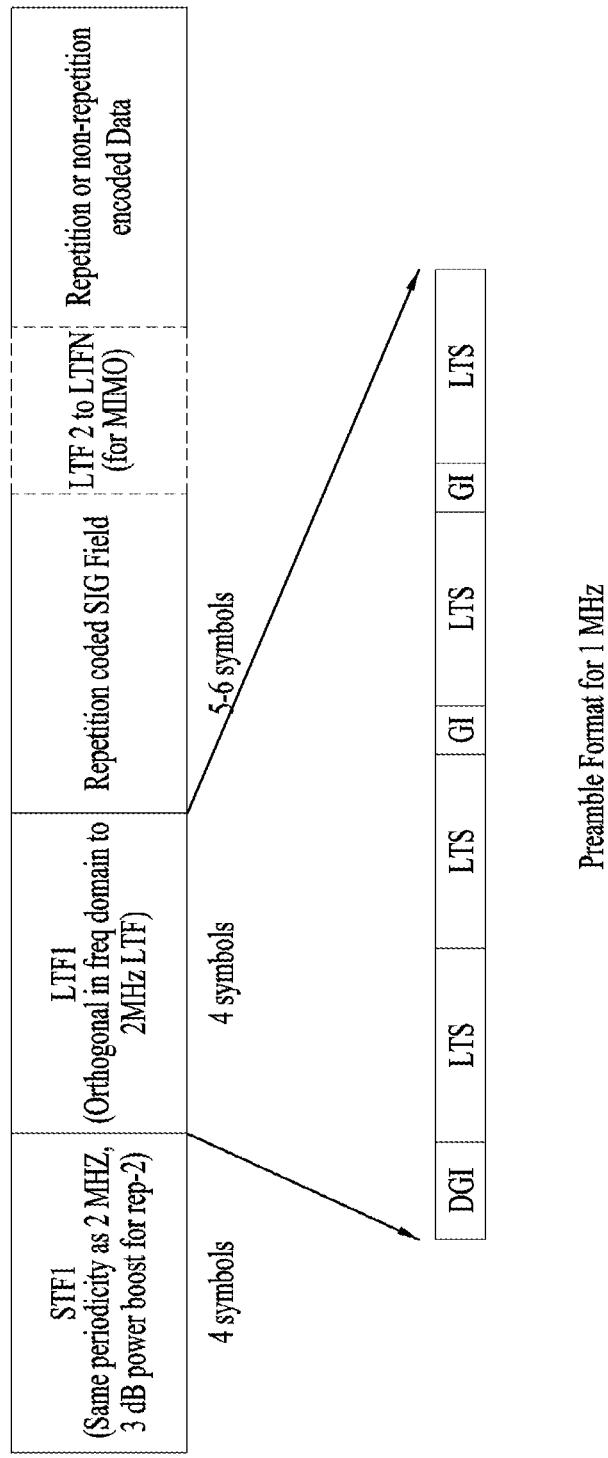
FIG. 16 illustrates a preamble format having a bandwidth of 1 MHz for an IEEE 802.11ah system to which the present invention is applicable.

FIG. 16 illustrates a preamble format having a bandwidth of 1 MHz for an IEEE 802.11ah system to which the present invention is applicable. Referring to FIG. 16, the preamble format with BW of 1 MHz includes STF1, LTF1, repeatedly coded SIG, one or more LTFs and a repeatedly or non-repeatedly encoded Data field.

Table 6 shows fields of the repeatedly coded SIG.

TABLE 6

| Field of SIG | Bits | Summary |
|---|---|---|
| STBC | 1 | same as the IEEE 802.11ac system |
| Num SS | 2 | Number of spatial streams (SSs) in the SU environment |
| SGI | 1 | Short Guard Interval |
| Coding | 2 | The first bit of this field indicates a coding type (LDPC/BCC), and the second bit thereof indicates ambiguity of the LDCP N-th symbol |
| MCS | 4 | MCS |
| Aggregation | 1 | Signals use of AMPDU |
| Length | 9 | Has a symbol unit when Aggregation is On, and has a byte unit when Aggregation is Off and/or the packet size of Mandate AMPDU is greater than or equal to 511 bytes |
| Ack Indication | 2 | 00: ACK; 01: BA; 10: No Ack; 11: reserved |
| Reserved | 4 | |
| CRC | 4 | |
| Tail | 6 | |
| Total | 36 | |

Medium Access Mechanism

In the IEEE 802.11-based WLAN system, a basic access mechanism of medium access control (MAC) is a Carrier Sense Multiple Access with Collision Avoidance (CSMA/CA) mechanism. The CSMA/CA mechanism, which is also called a Distributed Coordination Function (DCF) of IEEE 802.11 MAC, basically employs a "listen before talk" access mechanism. In accordance with this access mechanism, the AP and/or STA may perform Clear Channel Assessment (CCA) of sensing a radio frequency channel or medium in a predetermined time interval (e.g., DCF Inter-Frame Space (DIFS), prior to data transmission. When it is determined in the sensing that the medium is in the idle state, frame transmission begins through the medium. On the other hand, when it is sensed that the medium is in the occupied state, the AP and/or STA does not start transmission, but establishes a delay time (e.g., a random backoff period) for medium access, and attempts to perform frame transmission after waiting during the period. Through application of a random backoff period, it is expected that multiple STAs will attempt to start frame transmission after waiting for different times, resulting in minimized collision.

In addition, the IEEE 802.11 MAC protocol provides a hybrid coordination function (HCF). HCF is based on the DCF and the point coordination function (PCF). PCF refers to a polling-based synchronous access scheme in which polling is periodically executed to allow all reception APs and/or STAs to receive a data frame. In addition, the HCF includes enhanced distributed channel access (EDCA) and HCF controlled channel access (HCCA). EDCA is achieved when the access scheme provided to multiple users by a provider is based on contention. HCCA is achieved in the contention-free channel access scheme which employs the polling mechanism. In addition, the HCF includes a medium access mechanism for improving Quality of Service (QoS) of the WLAN, and may transmit QoS data during both the contention period (CP) and the contention free period (CFP).

Figure 17:
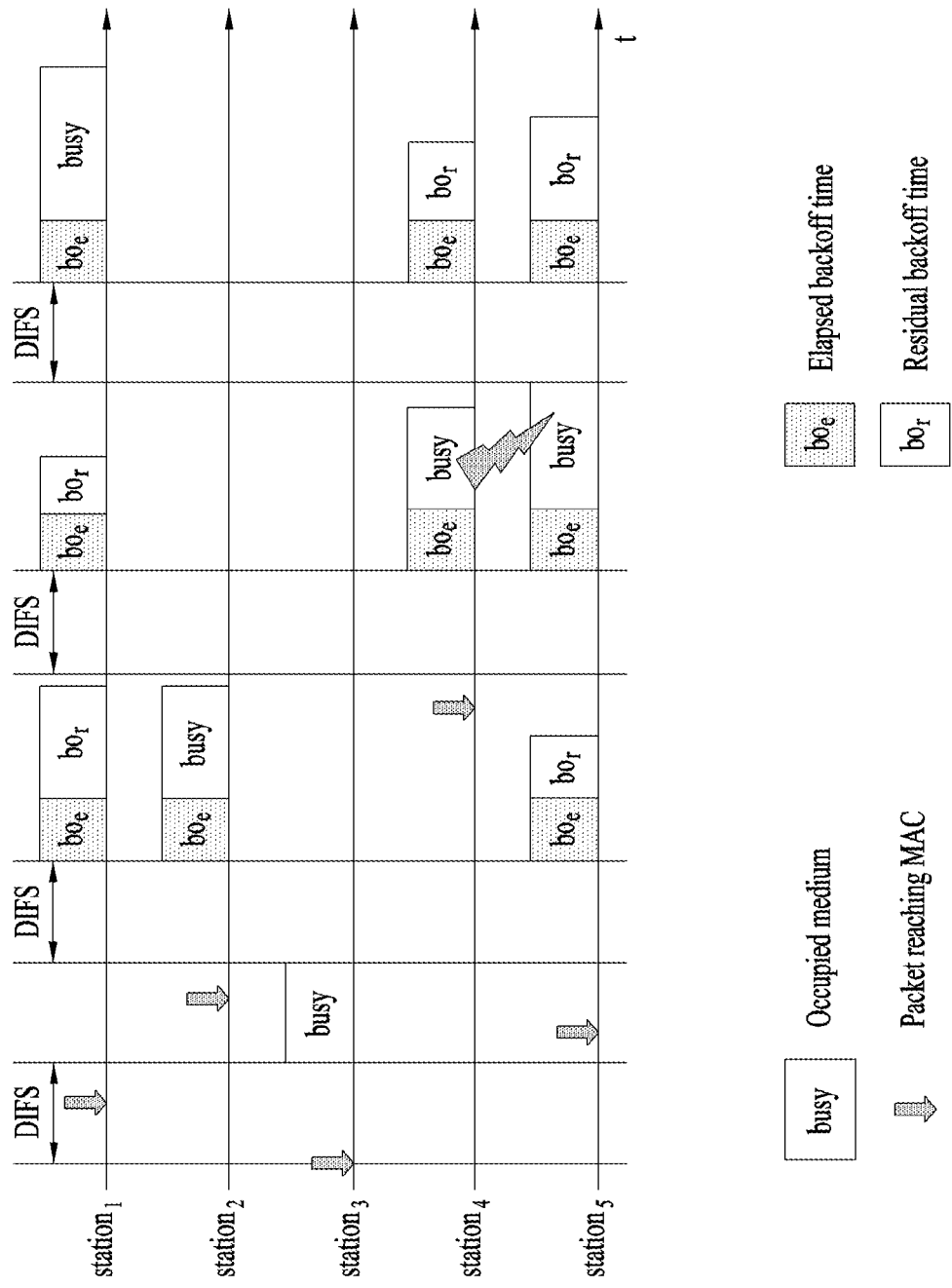
FIG. 17 illustrates a backoff process in a WLAN system to which the present invention is applicable.

FIG. 17 illustrates a backoff process in a WLAN system to which the present invention is applicable.

Hereinafter, operations based on a random backoff period will be described with reference to FIG. 17.

If the medium is switched from the occupied or busy state to the idle state, several STAs may attempt to transmit data (or frames). In a method to minimize collisions, each STA selects a random backoff count, waits for a slot time corresponding to the selected backoff count, and then attempts to start transmission. The random backoff count has a value of a pseudo-random integer, and may be set to a value in a range between 0 and CW. Herein, CW is a contention window parameter value. Although the CW parameter is given CWmin as the initial value, the initial value may be doubled if transmission fails (for example, if ACK of the transmission frame is not received). If the CW parameter value is CWmax, CWmax is maintained until data transmission is successful, and at the same time data transmission may be attempted. If data transmission is successful, the CW parameter value is reset to CWmin. Preferably, the values of CW, CWmin, and CWmax are set to $2n-1$ (where $n=0, 1, 2, \ldots$ ).

Once the random backoff process begins, the STA continuously monitors the medium while counting down the backoff slot according to a determined backoff count value. If the medium is monitored as being in the occupied state, the STA stops the countdown and waits for a predetermined time. If the medium is in the idle state, the remaining countdown restarts.

In the example shown in FIG. 17, if a packet for STA3 to transmit reaches MAC of STA3, the STA3 may confirm that the medium is in the idle state in the DIFS and immediately transmit a frame. In the meantime, the remaining STAs monitor the busy state of the medium, and operate in the standby mode. During operation of STA3, each of STA1, STA2, and STA5 may have data to be transmitted. If the idle state of the medium is monitored, each of STA1, STA2, and STA5 waits for the DIFS time and then performs countdown of the backoff slot according to a random backoff count value which they have selected. In the example shown in FIG. 17, STA2 selects the least backoff count value and STA1 selects the greatest backoff count value. That is, when the STA2 starts data transmission after completing backoff counting, the residual backoff time of STA5 is shorter than the residual backoff time of STA1. Each of STA1 and STA5 temporarily stops countdown and waits while STA2 occupies the medium. When occupancy by the STA2 is terminated and the medium returns to the idle state, each of STA1 and STA5 waits for a predetermined DIFS time, and restarts backoff counting. That is, after the residual backoff slot as long as the residual backoff time is counted down, frame transmission may start. Since the residual backoff time of STA5 is shorter than that of STA1, STA5 starts frame transmission. Meanwhile, STA4 may be given data to be transmitted while STA2 occupies the medium. In this case, when the medium is in the idle state, STA4 may wait for the DIFS time, perform countdown according to the random backoff count value selected by the STA4, and then start frame transmission. In the example of FIG. 17, the residual backoff time of STA5 coincides with the random backoff count value of STA4 by chance. In this case, collision may occur between STA4 and STA5. If collision occurs between STA4 and STA5, none of STA4 and STA5 receives ACK, and accordingly data transmission fails. In this case, each of STA4 and STA5 may double the CW value, select a random backoff count value and then perform countdown. Meanwhile, STA1 waits while the medium is in the occupied state due to transmission operation by STA4 and STA5. In this case, when the medium returns to the idle state, STA1 may wait for the DIFS time, and then start frame transmission after lapse of the residual backoff time.

Sensing Operation of STA

As described above, the CSMA/CA mechanism includes not only a physical carrier sensing through which the AP and/or STA directly sense the medium, but also virtual carrier sensing. The virtual carrier sensing is performed to address some problems (such as a hidden node problem) encountered in the medium access. In the virtual carrier sensing, MAC of the WLAN system may use a network allocation vector (NAV). By means of the NAV value, the AP and/or STA which is using the medium or has authority to use the medium indicates, for another AP and/or another STA, the remaining time until the medium becomes available. Accordingly, the NAV value may correspond to a reserved period during which the medium is used by the AP and/or STA to transmit a frame. An STA having received the NAV value may be prohibited from medium access during the corresponding period. For example, NAV may be set according to the value of the duration field in the MAC header of a frame.

A robust collision detection mechanism has been introduced to reduce the probability of such collision. Hereinafter, this mechanism will be described with reference to FIGS. 18 and 19. The actual carrier sensing range may not be identical to the transmission range, but for simplicity of description, it will be assumed that the actual carrier sensing range is identical to the transmission range.

Figure 18:
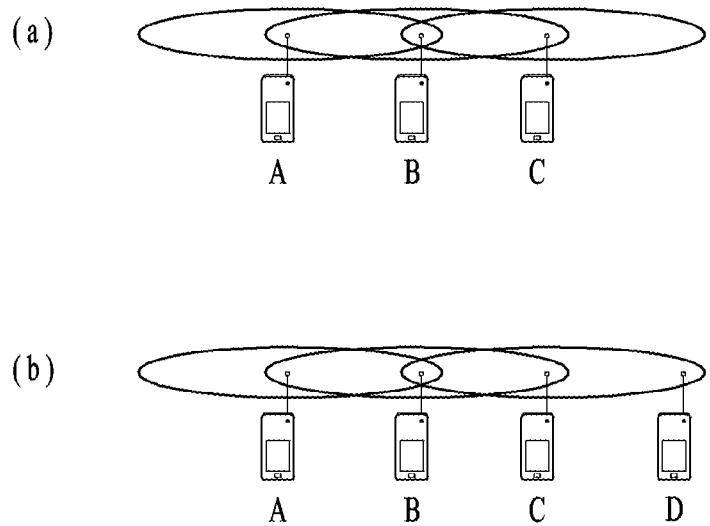
FIG. 18 illustrates a hidden node and an exposed node.

FIG. 18 illustrates a hidden node and an exposed node.

FIG. 18(a) exemplarily shows a hidden node. In FIG. 13(a), STA A communicates with STA B, and STA C has information to be transmitted. Specifically, STA C may determine that the medium is in the idle state in performing carrier sensing prior to transmission of data to STA B, even in a situation in which STA A is transmitting information to STA B. This is because transmission by STA A (i.e., occupied medium) may not be sensed at the location of STA C. In this case, collision may occur since STA B receives information of STA A and information of STA C simultaneously. In this case, STA A may be considered a hidden node of STA C.

FIG. 18(b) exemplarily shows an exposed node. In FIG. 13(b), STA C has information to be transmitted to STA D in a situation in which STA B is transmitting data to STA A. In this case, STA C may perform carrier sensing and determine that the medium is occupied due to transmission of STA B. Therefore, although STA C has information to be transmitted to STA D, STA C should wait until the medium returns to the idle state since the occupied state of the medium is sensed. However, since STA A is actually located out of the transmission range of STA C, transmission from STA C may not collide with transmission from STA B in view of STA A, and STA C is unnecessarily waiting until STA B stops transmission. In this case, STA C may be viewed as an exposed node of STA B.

Figure 19:
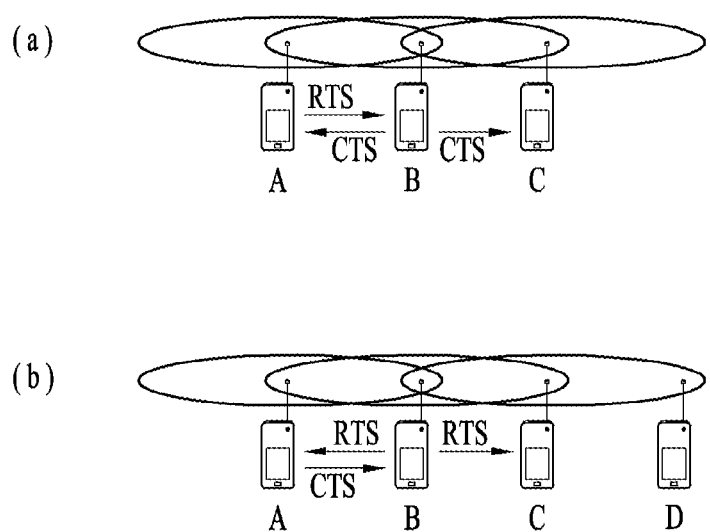
FIG. 19 illustrates RTS and CTS.

FIG. 19 illustrates RTS and CTS.

In order to efficiently utilize the collision avoidance mechanism in an exemplary situation as shown in FIG. 18, short signaling packets such as RTS (request to send) and CTS (clear to send) may be used. RTS/CTS between two STAs may be overheard by nearby STA(s), such that the nearby STA(s) may consider whether information is communicated between the two STAs. For example, if an STA to transmit data transmits an RTS frame to another STA to receive data, the STA to receive data may transmit the CTS frame to nearby STAs, thereby informing the nearby STAs that the STA is about to receive data.

FIG. 19(a) exemplarily shows a method to solve the hidden node problem. The method assumes a situation in which both STA A and STA C attempt to transmit data to STA B. If STA A transmits RTS to STA B, STA B transmits CTS to both STA A and STA C located around STA B. As a result, STA C waits until STA A and STA B stop data transmission, and thus collision is avoided.

FIG. 19(b) exemplarily shows a method to solve the exposed node problem. STA C may overhear RTS/CTS transmission between STA A and STA B, thereby determining that no collision will occur when it transmits data to another STA (e.g., STA D). That is, STA B may transmit RTS to all the nearby STAs, and transmits CTS only to STA A which actually has data to transmit. Since STA C receives only the RTS, but fails to receive the CTS of STA A, STA C may recognize that STA A is located out of the carrier sensing range of STA C.

Power Management

As described above, STAs in the WLAN system should perform channel sensing before they perform transmission/reception operation. Persistently performing channel sensing causes persistent power consumption of the STA. There is not much difference in power consumption between the reception state and the transmission state, and continuous maintenance of the reception state may cause large load to the STAs provided with limited power (i.e., operated by a battery). Therefore, if an STA maintains the reception standby mode so as to persistently sense the channel, power is inefficiently consumed without special advantages in terms of WLAN throughput. To address this problem, the WLAN system supports a power management (PM) mode of the STA.

The PM mode of the STA is classified into an active mode and a power save (PS) mode. The STA is basically operated in the active mode. The STA operating in the active mode maintains an awake state. When the STA is in the awake state, the STA may normally perform frame transmission/reception, channel scanning, or the like. On the other hand, the STA in the PS mode operates by being switched between the sleep state and the awake state. The STA in the sleep state operates with minimum power and does not perform either frame transmission/reception or channel scanning.

As the time for which the STA operates in the sleep state increases, the amount of power consumption of the STA is reduced, and accordingly the STA operation period increases. However, since transmission or reception of the frame is not allowed in the sleep state, the STA cannot operate unconditionally in the sleep state for a long time. When the STA operating in the sleep state is given a frame to be transmitted to the AP, it may be switched to the awake state to transmit/receive the frame. On the other hand, when the AP has a frame to transmit to the STA which is in sleep-state, the STA cannot receive the frame. Nor can the STA recognize presence of the frame. Accordingly, in order to recognize presence or absence of a frame to be transmitted to the STA (or in order to receive the frame if the frame is present), the STA may need to be switched to the awake state according to a specific period.

Figure 20:
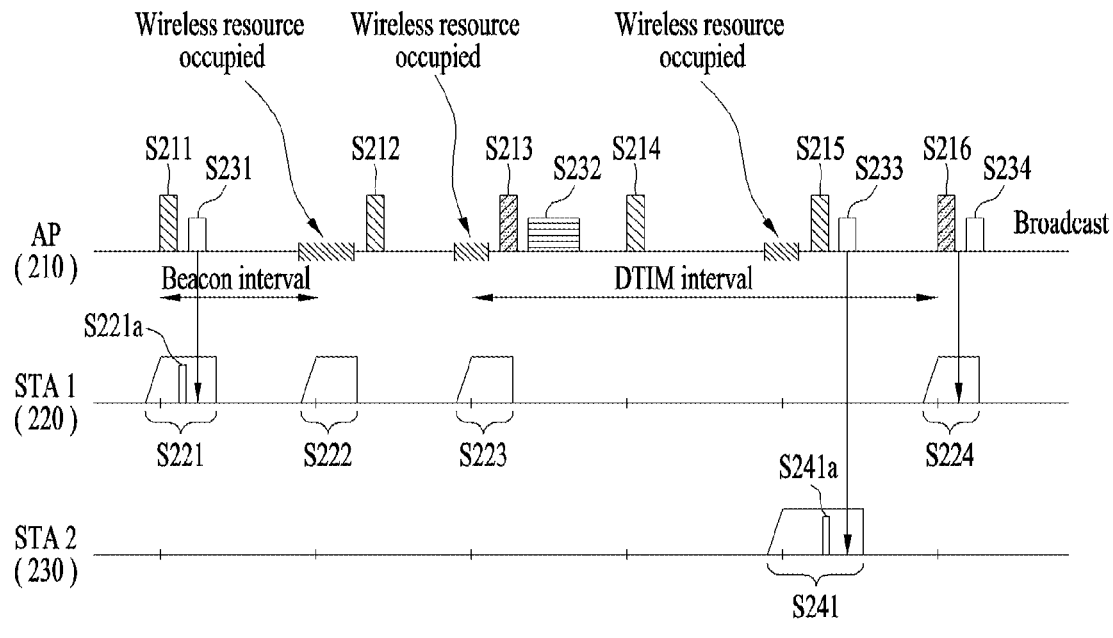
FIG. 20 illustrates a power management operation.

FIG. 20 illustrates a power management operation.

Referring to FIG. 20, AP 210 transmits a beacon frame to STAs present in the BSS at predetermined time intervals (S211, S212, S213, S214, S215 and S216). The beacon frame includes a traffic indication map (TIM) information element. The TIM information element contains information indicating that the AP 210 has buffered traffic for the STAs associated with the AP 210 and that a frame will be transmitted. The TIM element includes a TIM used to inform of a unicast frame and a delivery traffic indication map (DTIM) used to inform of a multicast or broadcast frame.

AP 210 may transmit a DTIM once per three transmissions of the beacon frame.

STA1 220 and STA2 222 are operating in the PS mode. Each of STA1 220 and STA2 222 may be set to be switched from the sleep state to the awake state at every wakeup interval of a predetermined period to receive the TIM element transmitted by the AP 210. Each STA may calculate a switching time to switch to the awake state, based on its own local clock. In the example shown in FIG. 20, it is assumed that the clock of the STA coincides with that of the AP.

For example, the predetermined wakeup interval may be set in such a manner that STA1 220 can switch to the awake state at every beacon interval to receive the TIM element. Accordingly, when AP 210 transmits the beacon frame for the first time (S211), STA1 220 may switch to the awake state (S221). Thereby, STA1 220 may receive the beacon frame and acquire the TIM element. If the acquired TIM element indicates that there is a frame to be transmitted to STA1 220, STA1 220 may transmit a power save-Poll (PS-Poll) frame, which requests transmission of the frame, to the AP 210 (S221a). In response to the PS-Poll frame, the AP 210 may transmit the frame to STA 1 220 (S231). After completing reception of the frame, STA1 220 is switched back to the sleep state to operate in the sleep state.

When the AP 210 transmits the beacon frame for the second time, the medium is in the busy state in which the medium is accessed by another device, and accordingly the AP 210 may not transmit the beacon frame at the correct beacon interval, but may transmit the beacon frame at a delayed time (S212). In this case, STA1 220 is switched to the awake state in accordance with the beacon interval, but does not receive the beacon frame whose transmission is delayed, and is thus switched back to the sleep state (S222).

When the AP 210 thirdly transmits the beacon frame, the beacon frame may include a TIM element set to a DTIM. However, since the medium is in the busy state, the AP 210 transmits the beacon frame at a delayed time (S213). STA1 220 is switched to the awake state in accordance with the beacon interval, and may acquire the DTIM through the beacon frame transmitted by the AP 210. It is assumed that the DTIM acquired by STA1 220 indicates that there is no frame to be transmitted to STA1 220, but there is a frame for another STA. In this case, STA1 220 may confirm that there is no frame to receive and be switched back to the sleep state to operate in the sleep state. After transmission of the beacon frame, the AP 210 transmits the frame to the corresponding STA (S232).

The AP 210 fourthly transmits the beacon frame (S214). STA1 220 may adjust the wakeup interval for reception of the TIM element since it did not acquire information indicating presence of buffered traffic for STA1 220 through the two previous operations of reception of the TIM element. Alternatively, provided that signaling information for adjustment of the value of the wakeup interval of STA1 220 is contained in the beacon frame transmitted by the AP 210, the wakeup interval value of the STA1 220 may be adjusted. In this example, STA1 220 may be set to be switched to the awake state once at every three beacon intervals to receive a TIM element rather than being set to be switched between the operating states at every beacon interval. Therefore, when the AP 210 fifthly transmits the beacon frame (S215) after the fourth transmission of the beacon frame (S214), STA1 220 maintains the sleep state, and thus cannot acquire the corresponding TIM element.

When AP 210 sixthly transmits the beacon frame (S216), STA1 220 may be switched to the awake state and acquire the TIM element contained in the beacon frame (S224). Since the TIM element is a DTIM indicating presence of a broadcast frame, STA1 220 may receive the broadcast frame transmitted by the AP 210 without transmitting a PS-Poll frame to the AP 210 (S234). In the meantime, the wakeup interval set by STA2 230 may have a greater length than the wakeup interval of STA1 220. Accordingly, STA2 230 is switched to the awake state at a time point (S215) when the AP 210 fifthly transmits the beacon frame, such that the STA2 230 may receive the TIM element (S241). STA2 230 may recognize presence of a frame to be transmitted thereto through the TIM element and transmit the PS-Poll frame to the AP 210 in order to request frame transmission (S241a). The AP 210 may transmit the frame to STA2 230 in response to the PS-Poll frame (S233).

In order to operate/manage the PS mode as shown in FIG. 20, the TIM element includes a TIM indicating presence or absence of a frame to be transmitted to the STA or a DTIM indicating presence or absence of a broadcast/multicast frame. The DTIM may be implemented through field setting for the TIM element.

Figure 21:
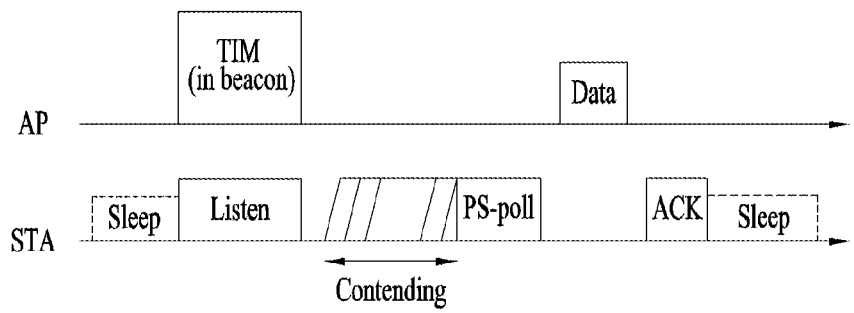
FIGS. 21 to 23 illustrate operations of a station (STA) having received a TIM in detail.
Figure 22:
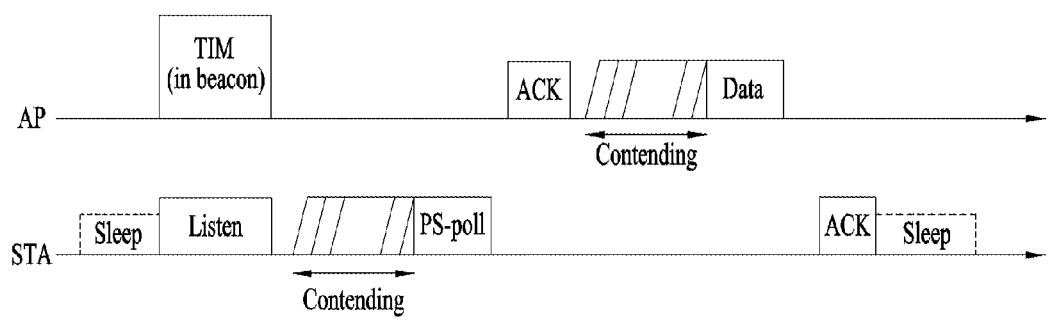
Figure 23:
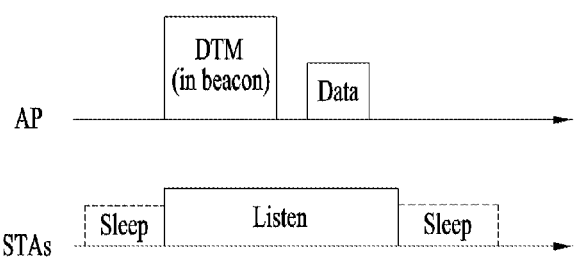

FIGS. 21 to 23 illustrate operations of an STA having received a TIM in detail.

Referring to FIG. 21, an STA is switched from the sleep state to the awake state to receive the beacon frame including a TIM from the AP. The STA interprets the received TIM element such that it can recognize presence of buffered traffic to be transmitted thereto. After the STA contends with other STAs to access the medium for PS-Poll frame transmission, the STA may transmit a PS-Poll frame to the AP to request data frame transmission. The AP, upon receiving the PS-Poll frame transmitted from the STA, may transmit the frame to the STA. The STA may receive the data frame and transmit an ACK frame to the AP in response to the received data frame. Thereafter, the STA may be switched back to the sleep state.

As shown in FIG. 21, the AP may operate in a manner of immediate response in which the AP transmits the data frame when a predetermined time (e.g., a short inter-frame space (SIFS)) elapses after the AP receives the PS-Poll frame from the STA. However, the AP may operate in a manner of deferred response if the AP fails to prepare a data frame to be transmitted to the STA for the SIFS time after receiving the PS-Poll frame, which will be described in detail with reference to FIG. 22.

In the example of FIG. 22, the operations of the STA of switching from the sleep state to the awake state, receiving a TIM from the AP, and transmitting the PS-Poll frame to the AP through contention are identical to those in the example of FIG. 21. If the AP having received the PS-Poll frame fails to prepare a data frame for the SIFS time, the AP may transmit an ACK frame to the STA instead of transmitting the data frame. If the data frame is prepared after transmission of the ACK frame, the AP may perform contention and transmit the data frame to the STA. The STA may transmit the ACK frame indicating successful reception of the data frame to the AP, and then be switched to the sleep state.

FIG. 23 shows an exemplary case in which AP transmits DTIM. STAs may be switched from the sleep state to the awake state so as to receive the beacon frame including a DTIM element from the AP. The STAs may recognize, through the received DTIM, that a multicast/broadcast frame will be transmitted. After transmitting the beacon frame including the DTIM, the AP may immediately transmit data (i.e., a multicast/broadcast frame) without transmitting/receiving the PS-Poll frame. While the STAs continue to maintain the awake state even after receiving the beacon frame including the DTIM, the STAs may receive data and then switch back to the sleep state after data reception is completed.

TIM Structure

In the method for operating the power save (PS) mode based on the TIM (or DTIM) protocol described above with reference to FIGS. 21 to 23, STAs may determine presence or absence of a data frame to be transmitted therefor through STA identification information contained in the TIM element. STA identification information may be specific information associated with an association identifier (AID) to be allocated when an STA is associated with an AP.

The AID is used as a unique ID of each STA within a BSS. For example, in the current WLAN system, an AID may be assigned a value between 1 and 2007. In the currently defined WLAN system, 14 bits for the AID may be allocated to a frame transmitted by an AP and/or an STA. Although the AID may be assigned any value up to 16383, the values from 2008 to 16383 are set as reserved values.

The TIM element according to legacy definition is inappropriate for M2M application in which a large number of STAs (e.g., at least 2007 STAs) are associated with one AP. If the conventional TIM structure is extended without any change, the TIM bitmap size may excessively increase. Accordingly, it may be impossible to support the extended TIM structure using the legacy frame format, and the extended TIM structure is inappropriate for M2M communications in which application of a low transfer rate is considered. In addition, it is expected that the number of STAs having a reception data frame during one beacon period is very small. Therefore, in view of the aforementioned exemplary application of M2M communication, it is expected that a TIM bitmap will have a large size with most bits set to zero (0) in many cases. Therefore, there is a need for a technology capable of efficiently compressing a bitmap.

In the legacy bitmap compression technology, a series of 0s is omitted from the front part of a bitmap to define an offset (or start point) value. However, compression efficiency is not high in the case in which the number of STAs including a buffered frame is small, but there is a great difference between AID values of the STAs. For example, in the case in which a frame to be transmitted only to STAs whose AIDs are set to 10 and 2000 is buffered, the length of the compressed bitmap is 1990, but all the parts of the bit map other than both end parts are set to zero (0). If the number of STAs associated with one AP is small, inefficiency of bitmap compression may not be a serious problem. However, if the number of STAs associated with one AP increases, such inefficiency may deteriorate overall system performance.

In order to address this issue, AIDs may be divided into a plurality of groups such that data can be more efficiently transmitted with the AIDs. A designated group ID (GID) is allocated to each group. Hereinafter, AIDs allocated on the group basis will be described with reference to FIG. 24.

Figure 24:
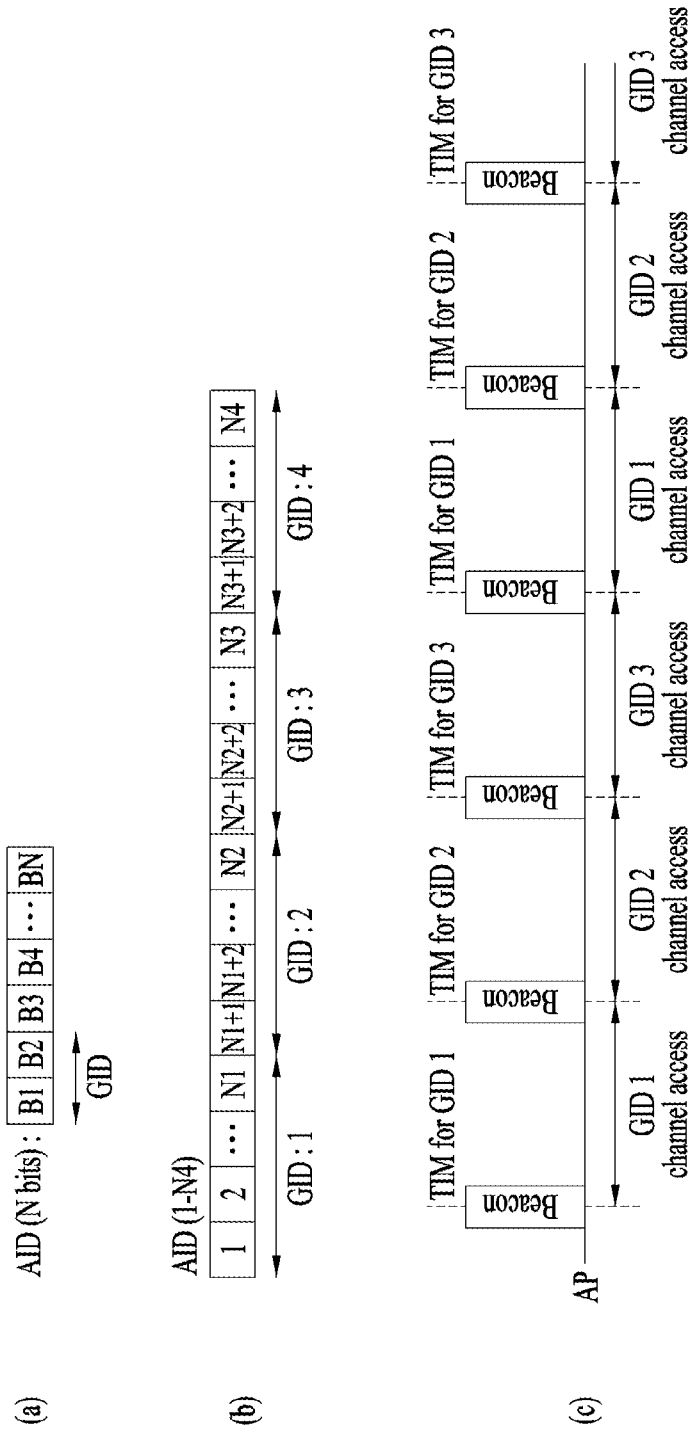
FIG. 24 illustrates a group-based AID.

FIG. 24 illustrates a group-based AID.

FIG. 24(a) is a diagram illustrating an exemplary AID allocated on the group basis. In FIG. 24(a), some bits located at the front part of the AID bitmap may be used to indicate a group ID (GID). For example, the first two bits of an AID bitmap may be used to designate four GIDs. If the total length of the AID bitmap is N bits, the first two bits (B1 and B2) may represent a GID of a corresponding AID.

FIG. 24(b) is a diagram illustrating another exemplary AID allocated on the group basis. In FIG. 24(b), a GID may be allocated according to the position of an AID. In this case, AIDs having the same GID may be represented by an offset and a length value. For example, if GID 1 is denoted by an offset A and a length B, this means that AIDs A to A+B−1 on a bitmap are set to GID 1. For example, FIG. 24(b) assumes that AIDs 1 to N4 are divided into four groups. In this case, AIDs belonging to GID 1 are denoted by 1 to N1, and may be represented by an offset of 1 and a length of N1. AIDs belonging to GID 2 may be represented by an offset of N1+1 and a length of N2−N1+1, AIDs belonging to GID 3 may be represented by an offset of N2+1 and a length of N3−N2+1, and AIDs belonging to GID 4 may be represented by an offset of N3+1 and a length of N4−N3+1.

If AIDs allocated on the group basis are introduced, channel access may be allowed in different time intervals according to GIDs. Thereby, the problem of lack of TIM elements for a large number of STAs may be solved and at the same time data transmission/reception may be efficiently performed. For example, in a specific time interval, channel access is allowed only for STA(s) corresponding to a specific group, and channel access of the remaining STA(s) may be restricted. A predetermined time interval in which only specific STA(s) are allowed to perform channel access may be referred to as a restricted access window (RAW).

Hereinafter, channel access based on GIDs will be described with reference to FIG. 24(c). FIG. 24(c) illustrates an exemplary channel access mechanism according to beacon intervals with AIDs divided into three groups. A first beacon interval (or a first RAW) is an interval in which channel access of an STA corresponding to an AID belonging to GID 1 is allowed, and channel access of STAs belonging to the other GIDs is not allowed. To implement this mechanism, a TIM element used only for AIDs corresponding to GID 1 is contained in a first beacon frame. A TIM element used only for AIDs corresponding to GID 2 is contained in a second beacon frame. Accordingly, channel access is allowed only for an STA corresponding to the AIDs belonging to GID 2 in a second beacon interval (or a second RAW). A TIM element used only for AIDs corresponding to GID 3 is contained in a third beacon frame. Accordingly, channel access is allowed only for an STA corresponding to the AIDs belonging GID 3 in a third beacon interval (or a third RAW). A TIM element used only for AIDs corresponding GID 1 is contained in a fourth beacon frame. Accordingly, channel access is allowed only for an STA corresponding to the AIDs belonging to GID 1 in a fourth beacon interval (or a fourth RAW). Thereafter, only channel access of an STA corresponding to a specific group indicated by the TIM contained in a corresponding beacon frame may be allowed in each of beacon intervals subsequent to the fifth beacon interval (or in each of RAWs subsequent to the fifth RAW).

While FIG. 24(*c*) exemplarily shows a case where the order of allowed GIDs is cyclic or periodic according to the beacon intervals, embodiments of the present invention are not limited thereto. That is, by including only AID(s) belonging to specific GID(s) in a TIM element (hereinafter, referred to as a "separated TIM operation"), only channel access of STA(s) corresponding to the specific AID(s) may be allowed in a specific time interval (for example, a specific RAW), and channel access of the other STA(s) may not be allowed.

The aforementioned group-based AID allocation scheme may also be referred to as a hierarchical structure of a TIM. That is, the entirety of an AID space may be divided into a plurality of blocks, and only STA(s) (i.e., STA(s) of a specific group) corresponding to a specific block having a value other than '0' may be allowed to perform channel access. Thereby, a large-sized TIM is divided into small-sized blocks/groups, an STA can easily maintain TIM information, and blocks/groups may be easily managed according to class, QoS or usage of the STA. While FIG. 24 exemplarily shows a 2-level hierarchy, a hierarchical TIM structure comprised of two or more levels may be configured. For example, the whole AID space may be divided into a plurality of page groups, each page group may be divided into a plurality of blocks, and each block may be divided into a plurality of sub-blocks. In this case, an extended version of the example of FIG. 13(*a*) may be configured such that first N1 bits in an AID bitmap represent a page ID (PID), the next N2 bits represent a block ID, the next N3 bits represent a sub-block ID, and the remaining bits represent the position of STA bits within a sub-block.

Although not shown in FIG. 24, an STA may acquire information about a TIM element (e.g., TIM for GID 1, 2, 3) classified according to each group described above through a normal beacon (e.g., a DTIM beacon, a long beacon) transmitted with a long periodicity. For example, while the STA is performing the process of association with an AP, the STA may acquire information about a TIM element (e.g., TIM for GID 1, 2, 3) classified according to each group (e.g., a transmission period/length of a TIM element classified according to each group, a slot time in each group access interval, etc.) from a beacon transmitted with a long periodicity, and receive the TIM element by switching to the awake state during the period for which the TIM element of the group to which the STA belongs is transmitted. The TIM element classified according to each group may be referred to as a TIM segment.

Various schemes for dividing STAs (or AIDs allocated to the STAs) into predetermined hierarchical group units and managing the same may be applied to the examples of the present invention disclosed below. However, the group-based AID allocation schemes are not limited to these examples.

AID Change

The AID assigned to an STA may be reassigned and changed for various reasons. The AID may be changed to another AID in the same group, or may be changed to an AID belonging to another group. For example, when TIM compression is performed to reduce the length of a TIM element, efficient TIM compression may be ensured if the values of AIDs assigned to STAs are close to each other. Thereby, an STA may need tp change the AID to another AID in the same group. In this case, the AP may perform efficient TIM compression by changing the AID of the STA to another AID in the same group.

As another example, if a group to which the AID assigned to an STA belongs reaches the maximum capacity thereof and thus the STA has a difficulty in performing channel access, the STA may need to make a request for change of the group of the SAT to another group. In this case, the STA may make a request to the AP for change of the AID to an AID of another group, or the AP may make the AID of another group reassigned to the STA.

FIG. 25 illustrates change of an AID of an STA in the same group, focusing on signaling. The AP may transmit an "AID assignment with Same GID" frame to the STA such that the AID of the STA is reassigned. FIG. 26 shows the AID assignment with Same GID frame.

In FIG. 26, the AID field indicates a new AID to be assigned to the STA, and the Current Num of AID field indicates the number of assigned AIDs (STAs) included in the group to which the AID to be reassigned belongs.

The AP may transmit the AID assignment with Same GID frame to the STA at a necessary time, thereby informing the STA of a new AID. Upon receiving the frame, the STA may transmitting an ACK frame to the AP to inform that the new AID has been successfully assigned.

FIG. 27 illustrates change of an AID of an STA belonging to a specific group to an AID of another group, focusing on signaling. An STA desiring to reassign the AID belonging to another group may transmit an AID Assignment request frame to the AP to request AID reassignment to an AID belonging to another GID. The AP may transmit an AID Assignment with Different GID frame to the STA such that the STA is assigned an AID belonging to another GID. Herein, the AP may transmit the AID Assignment with Different GID frame in response to the AID Assignment request frame from the STA, or may independently transmit the AID assignment with Different GID frame.

FIG. 27(*a*) is a diagram illustrating change of an AID of an STA which is independently performed by the AP. FIG. 27(*b*) is a diagram illustrating change of an AID of an STA according to a request from the STA.

When it is assumed that STAs belonging to a specific group are allowed to use a channel only in a channel access interval for an assigned group, a traffic for STAs may happen to be concentrated in the channel access interval for the specific group. In this case, the AP may change a traffic-concentrated group to which the STAs belong to another group to implement load distribution. In FIG. 27(*a*), it is assumed that STAs in a BSS are grouped into Group 1, Group 2 and Group 3, and STA 1, STA 2 and STA 3 belong to Group 1. If the traffic density of Group 1 is greater than that of another group during a specific period, the AP may move some of the STAs belonging to Group 1 to another group. In the example of FIG. 27(a), the AP reassigns AIDs of STA 2 and STA 3 in order to move STA2 and STA3 from Group 1 to Group 2.

In addition, a traffic property of an STA may be changed. In this case, the group of the STA needs to be changed according to the changed traffic property. The STA whose traffic property has been changed may make a request to the AP for change to a group proper for the changed traffic. That is, the STA make a request to the AP for AID reassignment for group change. If the AP receives the request for AID reassignment, the AP may reassign an AID of another group to the STA. In the example of FIG. 27(b), STAs are grouped into Group 1, Group 2 and Group 3, and STA 1 belongs to Group 3 until AID reassignment occurs. It can be seen from DTIM elements of FIG. 27(b) that Group 1 and Group 2 have a high duty cycle, and Group 3 has a low duty cycle. That is, while channel access intervals of Group 1 and Group 2 are repeated with a short periodicity, the channel access interval of Group 3 is repeated with a long periodicity. If the traffic property of STA 1 belonging to Group 3 is changed from the low duty cycle to the high duty cycle, STA 1 may transmit, to the AP, an AID reassignment request frame containing information about a group proper for the changed property (i.e., the high duty cycle) (namely, group information preferred by STA 1). The AP may reassign an AID proper for a group to which the old group is changed, based on the AID reassignment request frame received from the STA. In the example of FIG. 27(b), STA 1 is switched to Group 2 having a high duty cycle.

AID Change with Direct Link Configured

An STA may directly communicate with another STA without assistance from the AP. For example, the STA may directly communicate with another STA via a direct link based on a technique such as direct link setup (DLS), TDLS and Wi-Fi Direct. In this case, the STA may undergo a process of checking whether a frame received from the counterpart STA is directed thereto, in order to reduce unnecessary processing overhead. For example, if SIGA illustrated in FIG. 15 includes a Partial AID, the STA receiving a frame may check the Partial AID in SIGA to identify whether the frame is directed thereto. If the Partial AID does not coincide with the AID of the STA, the STA determines that the frame is not directed thereto and does not decode the payload part. Thereby, the STA may reduce unnecessary processing overhead. However, if the AID of the STA is changed, the counterpart STA performing direct communication with the STA whose AID has been changed may have a difficulty in performing direct communication since the counterpart STA does not know the changed AID of the STA. This situation will be described in detail below with reference to FIG. 28.

FIG. 28 illustrates a problem that may occur when an AID of an STA for which a direct link to another STA is set up changes. For simplicity of description, it is assumed that TDLS is adopted as a technique for direct communication between STAs. However, embodiments of the present invention are not limited thereto. The description given below may also be applied to direct communication via a direct link according to a technique such as DLS, Wi-Fi Direct and the like.

With direct communication between STA 1 and STA 2 shown in FIG. 28 enabled through TDLS, when the AP reassigns the AID of STA 1, STA 2 attempts to perform frame transmission to STA 1 using the old AID of STA 1 until the changed AID of STA 1 is updated. In this case, the updated AID does not coincides with an AID (e.g., Partial AID) contained in the frame, and therefore STA 1 determines that the frame is not a frame transmitted thereto and omits decoding of the payload part. Thereby, when the AID of STA 1 is updated, STA 2, which fails to recognize the update, has a difficulty in performing communication with STA 1. Hereinafter, description will be given of a transmission/reception method for solving the problem that may occur when the AID changes with a direct link configured.

Embodiment 1—AID Update in STA Having Direct Link

According to a first embodiment, an STA having reassigned an AID by the AP informs another STA on the direct link of AID change such that the AID is updated in another STA having the direct link. This embodiment will be described in detail with reference to FIGS. 29 to 44.

Figure 29:
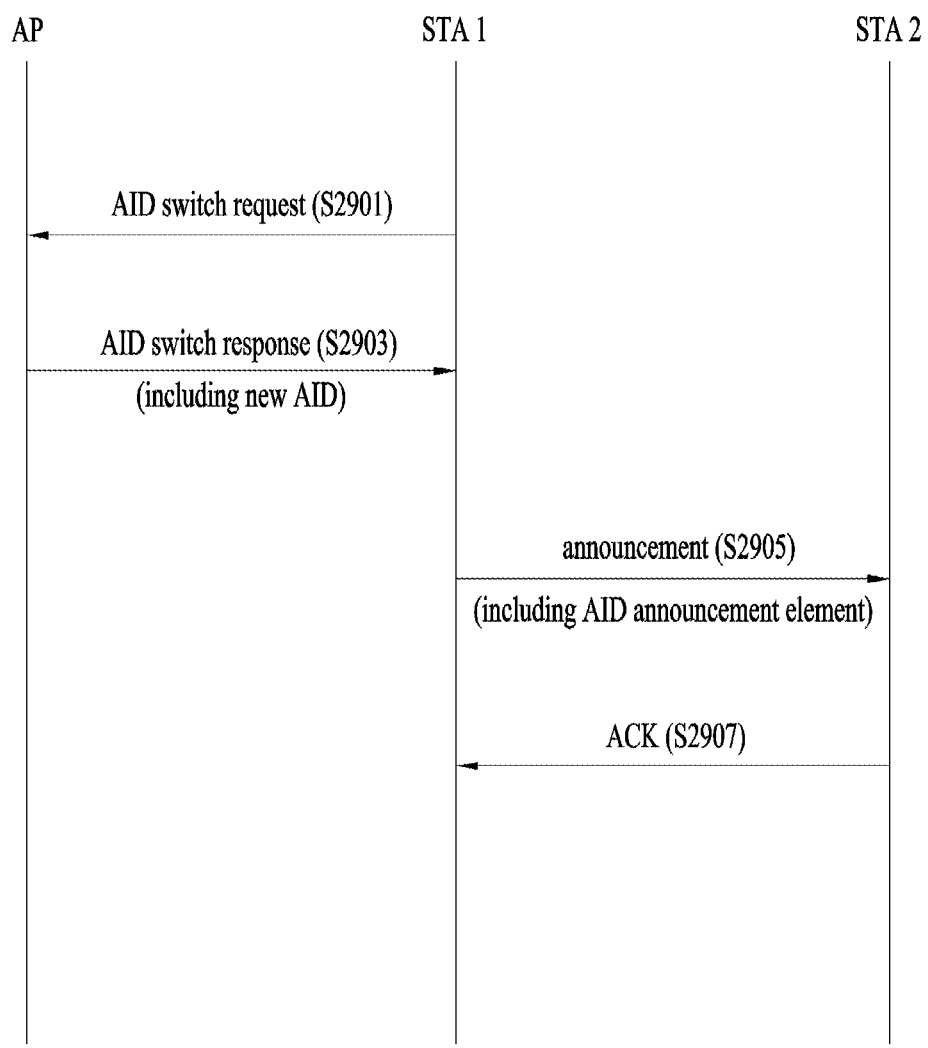

FIG. 29 illustrates signaling for updating an AID in an STA having a direct link. In step S2901, the STA may transmit an AID switch request frame to the AP. Herein, the AID switch request frame may include information for requesting reassignment/switch of an AID, and may be referred to as an AID reassignment request frame. In step S2903, the AP may transmit an AID switch response frame to STA 1 in response to the received AID switch request frame. The AID switch response frame may be referred to as an AID reassignment response frame, and include information about a new AID assigned to STA 1 by the AP. Upon receiving the AID switch response frame, STA 1 may use the new AID as an AID thereof. If STA 1 has a direct link such as TDLS to another STA (STA 2 in FIG. 29), STA 1 transmit an announcement frame related to an AID to STA 2. Herein, the announcement frame may be referred to as an AID update request frame, a TDLS AID update frame, or the like as described below. Regardless of the name by which the announcement frame is called, the announcement frame is a frame generated based on the new AID, and may include information (in the form of an AID announcement element) related to the new updated AID of STA 1. Upon receiving the announcement frame, STA 2 may update the AID of the STA corresponding to the frame with the new AID. Thereafter, STA 2 may transmit an ACK frame to the STA in response to the announcement frame (step S2907).

FIG. 30 shows examples of the aforementioned announcement frame, which may include newly assigned AID information, updated AID information, or an AID list (one or more AIDs) of the STA. Referring to FIG. 30(a), the announcement frame may includes a Category field, an S1G action field, and an AID Announcement Element field. Specific examples of the AID announcement element will be described with reference to FIGS. 31 to 33 later.

The announcement frame may be configured as shown in FIG. 30(b). Herein, the updated AID information may include new AID(s) assigned by the AP, an entire new AID list which an STA is currently storing, or AIDs which are associated with a peer STA and need to be updated. That is, the updated AID information may include at least one AID that the STA has.

FIG. 30(c) shows another example of the announcement frame. The Reason field may indicate a reason for transmission of the announcement frame, namely information about whether an AID is added, changed, or deleted. For example, the value 0 for the Reason field may indicate Add, 1 may indicate Change, and 2 may indicate Deleted. In this case, if the value of the Reason field is 0, added AIDs may be included in an Updated AID Information field. If the value of the Reason field is 1, information about changed AIDs (an old AID and a new AID) may be included in the Updated AID Information field. If the value of the Reason field is 2, deleted AIDs may be included and transmitted in the Updated AID Information field. Unlike the example shown in the figure, the Reason field may be included in the Updated AID Information field.

FIG. 31 shows a specific example of the AID Announcement Element field (or Updated AID Information field). Referring to FIG. 31(a), the AID Announcement Element field may include an Element ID field, a Length field, and an AID Entry field. The AID Entry field may include, as shown in FIG. 31(b), an STA MAC Address subfield and an Association ID subfield. In other words, the AID Entry field may include one or more "AID-MAC Address pairs". Herein, a MAC address indicated by the STA MAC Address subfield may be an updated MAC address of the STA, and the AID may be a new AID of the STA corresponding to the MAC address.

FIG. 32 shows another example of the AID Announcement Element field. The AID Entry Mode field may indicate information included in the AID Entry field. If the value of the AID Entry Mode field is 0, the AID Entry field may include only AIDs which are newly assigned to STAs. If the value of the AID Entry Mode field is 1, the AID Entry field may include one or more "AID-MAC Address pairs" as shown in FIG. 32(b).

FIG. 33 shows another example of the AID Announcement Element field. The 'STA's AID and STA's MAC address' field has a length greater than or equal to 2 bytes (indicated by the Length field). If the length of the field is 2 bytes, the field includes only AIDs which are newly assigned to STAs. If the length of the field is 8n octets, the field includes one or more "AID-MAC Address pairs". Herein, the AID-MAC Address pair is related to information about one or more STAs.

FIG. 34 shows another example of the AID Announcement Element field. The corresponding AID Announce Element field includes information about an old AID and a new AID, which is updated AID information of the STA. The Number of AID field indicates the number of updated AIDs and the number of Old AIDs and New AIDs. If the Number of AIDs is 0, this indicates that AID information currently being used will be changed. In this case, only new AIDs except for the old AIDs are included (i.e., 2 bytes) and transmitted. If a Reason field is included in the announcement frame as shown in FIG. 30 (c) and indicates Add/Delete (namely, a new AID is added or deleted), this field will indicate a new added AID or a deleted AID, and the Number of AID will be set to 0.

That is, the length of the Old AIDs and New AIDs field may be 2 bytes if the value of Number of AID is 0, and may be 4 to N bytes if the value of Number of AID is greater than 1. When the Reason field indicates 'Change', the Number of AID field set to 0 indicates that the AID currently being used (i.e., the AID signaled to the Peer STA) is changed. If only AID was signaled to the peer STA, the Number of AID field may be set to 0 in the case of 'Change'. If more than one AID was signaled, the Number of AID field may be set to a value equal to or greater than 1, information about the old AIDs and new AIDs may be included by the number N.

Hereinafter, various examples will be discussed based on the description of Embodiment 1. The description given below is based on the assumption of description of FIGS. 29 to 34. Accordingly, except for specially mentioned features, description of FIGS. 29 to 34 may be employed/applied in the description given below.

Figure 35:
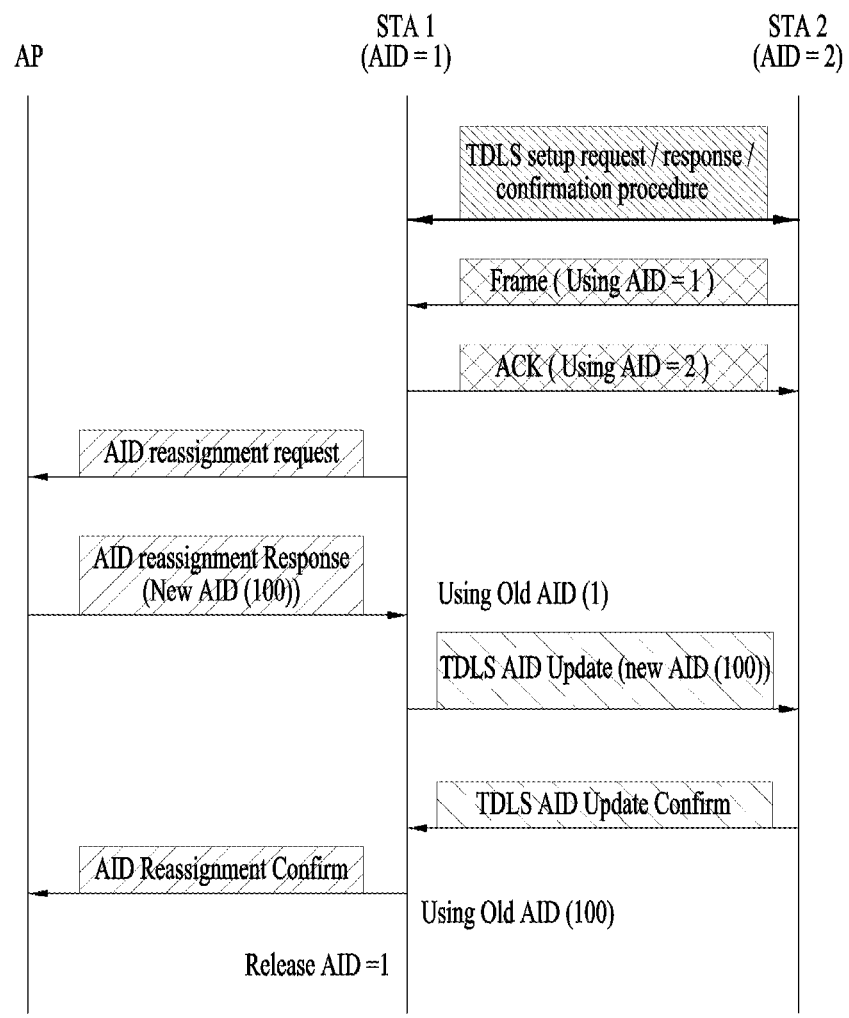

Referring to FIG. 35, after STA 1 performs the procedure of frame transmission/reception to STA 2 for new AID update (transmission of a TDLS AID update frame and reception of a TDLS AID confirm frame), STA 1 transmits to an AID reassignment confirm frame (or AID switch confirm frame) to the AP. In this case, the AP may perform frame transmission/reception with STA1 using the reassigned AID only after receiving the AID reassignment confirm frame. In relation to STA 2, STA 1 may perform transmission/reception using the new AID after receiving the TDLS AID update confirm frame. In relation to the AP, STA 1 may perform transmission/reception using the new AID after transmitting the AID reassignment confirm frame (or after receiving an ACK frame for the AID reassignment confirm frame from the AP).

Figure 36:
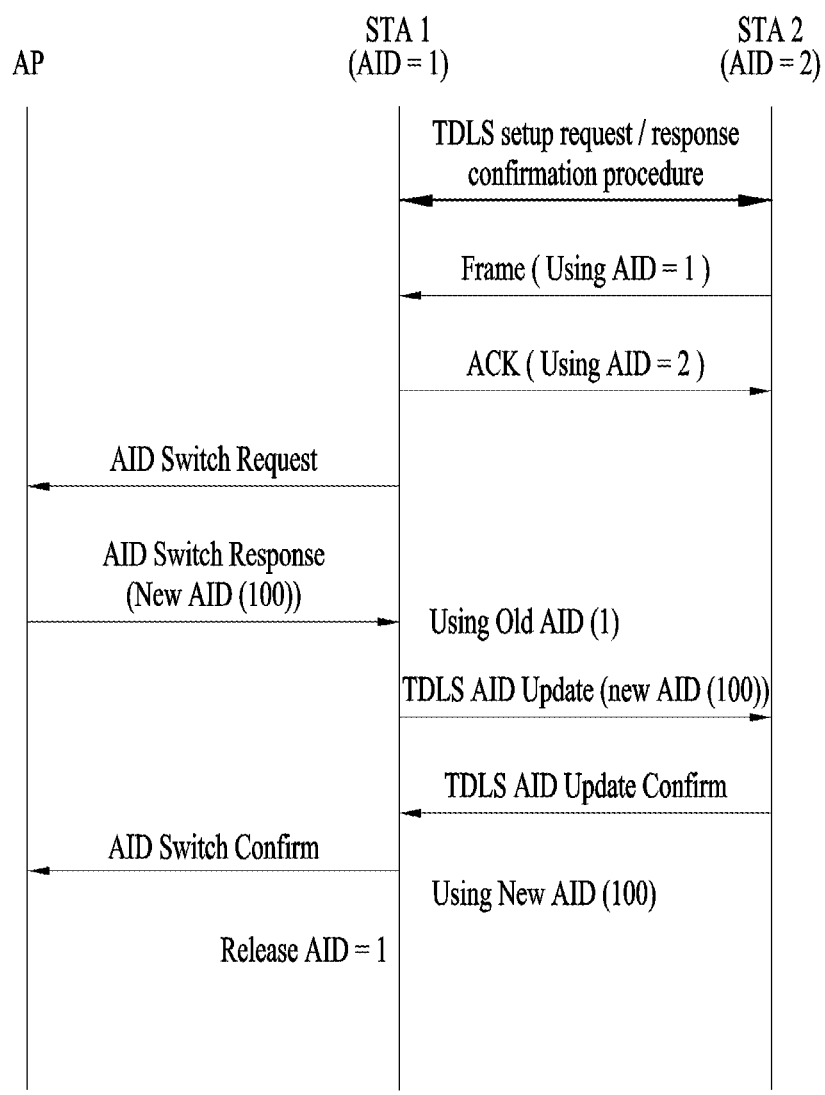

The example of FIG. 36 is different from the example of FIG. 35 in that a frame transmitted and received between the AP and STA 1 has a different name. As mentioned above, the AID reassignment request frame, AID reassignment response frame, and AID reassignment confirm frame may be understood as performing substantially the same functions of the AID switch request frame, AID switch response frame, AID switch confirm frame, respectively.

Figure 37:
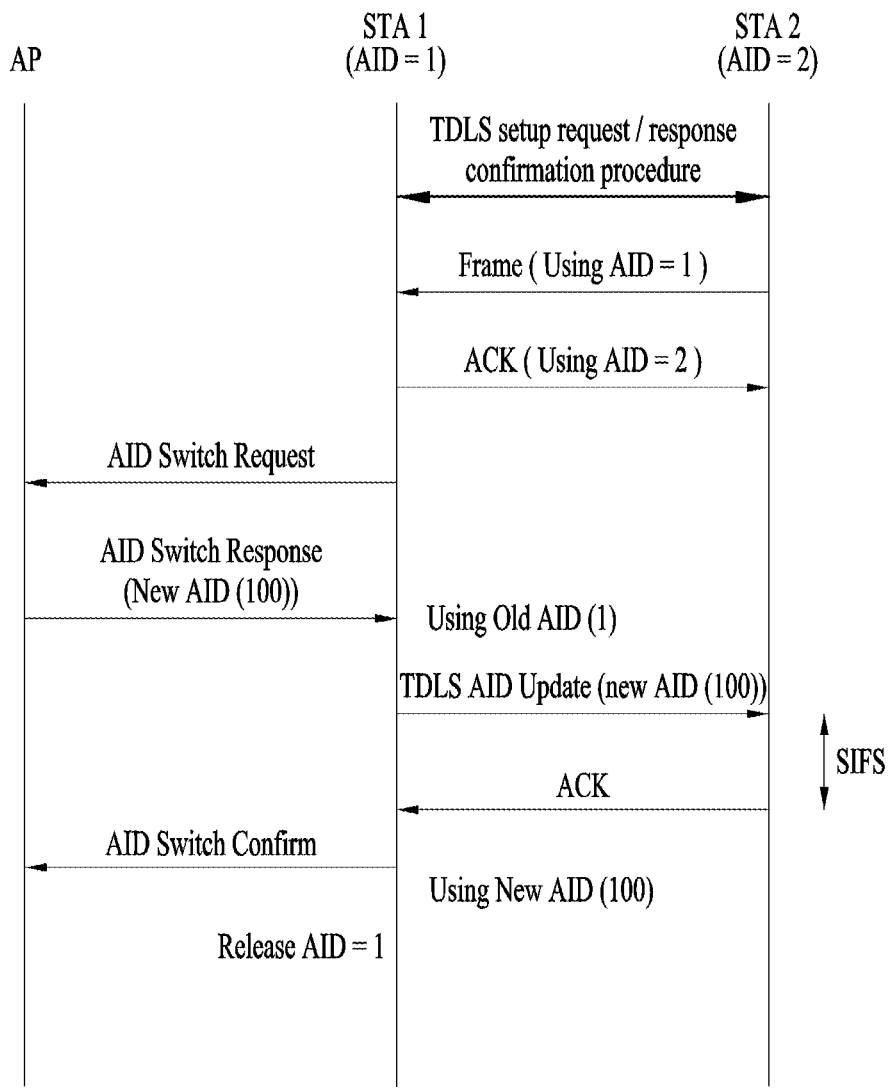

The example of FIG. 37 is different from the example of FIG. 36 in that STA 2 transmits an ACK frame in response to the TDLS AID update frame of STA 1 after time passes by SIFS.

Figure 38:
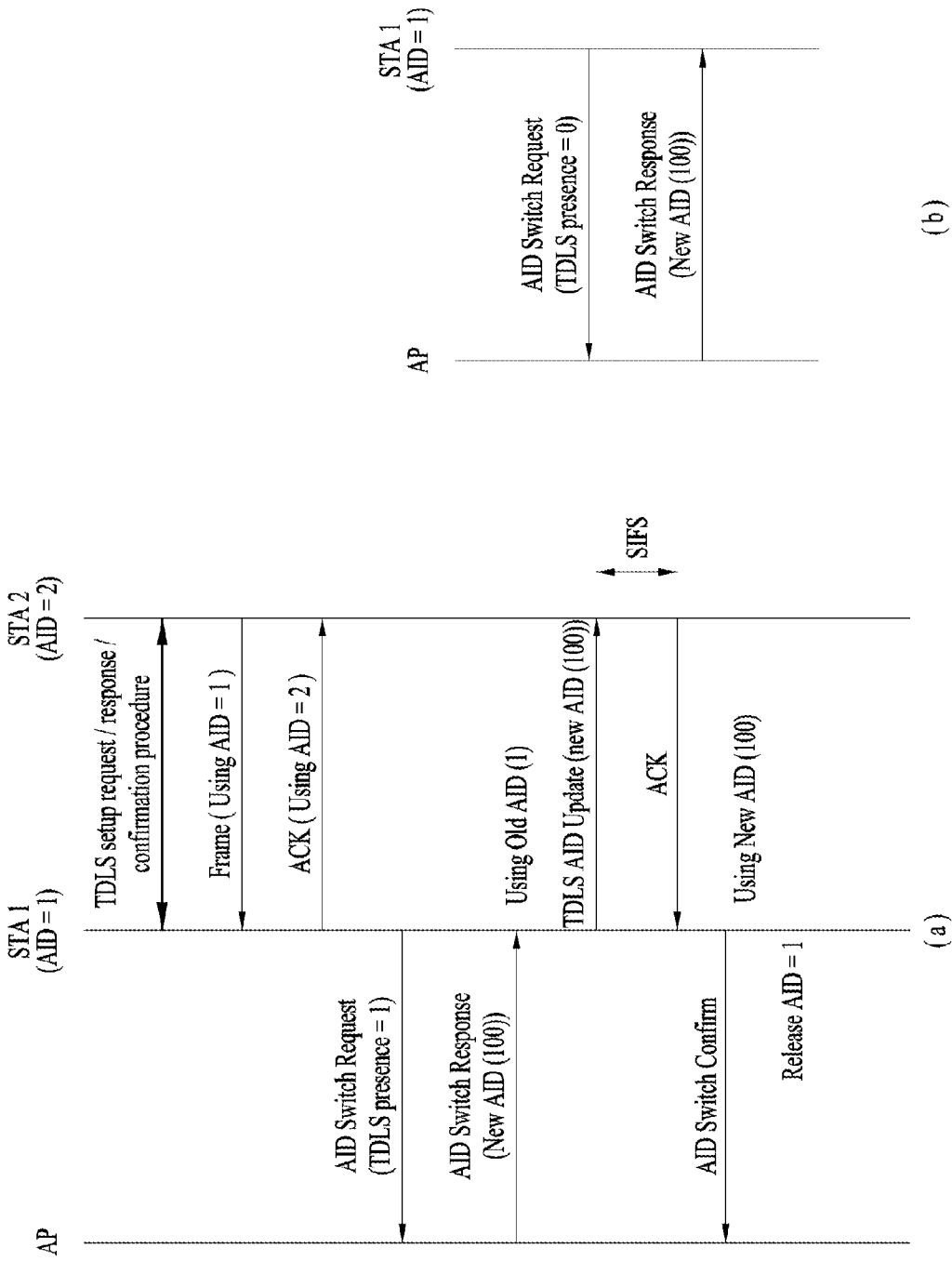

FIG. 38 illustrates a case where information associated with TDLS connection is included in the AID switch request frame. More specifically, the AID switch request frame which STA 1 transmits to the AP may include a parameter TDLS presence, which is information indicating whether or not STA 1 has a TDLS connection (connection via a direct link). The AP may recognize, through the parameter TDLS presence, whether STA 1 has a TDLS connection, thereby determining when a newly assigned AID can be used for frame transmission and reception with STA 1. More specifically, referring to FIG. 38(a), if the parameter TDLS presence is set to 1, the AP may recognize that STA 1 has a TDLS connection, and use the new AID after waiting for an AID switch confirm frame to be received. If the parameter TDLS presence is set to 0, as shown in FIG. 38(b), the AP may use the new AID without waiting for an AID switch confirm frame after transmitting an AID switch request frame (or when a predetermined time elapses after the AID switch request frame is transmitted).

Figure 39:
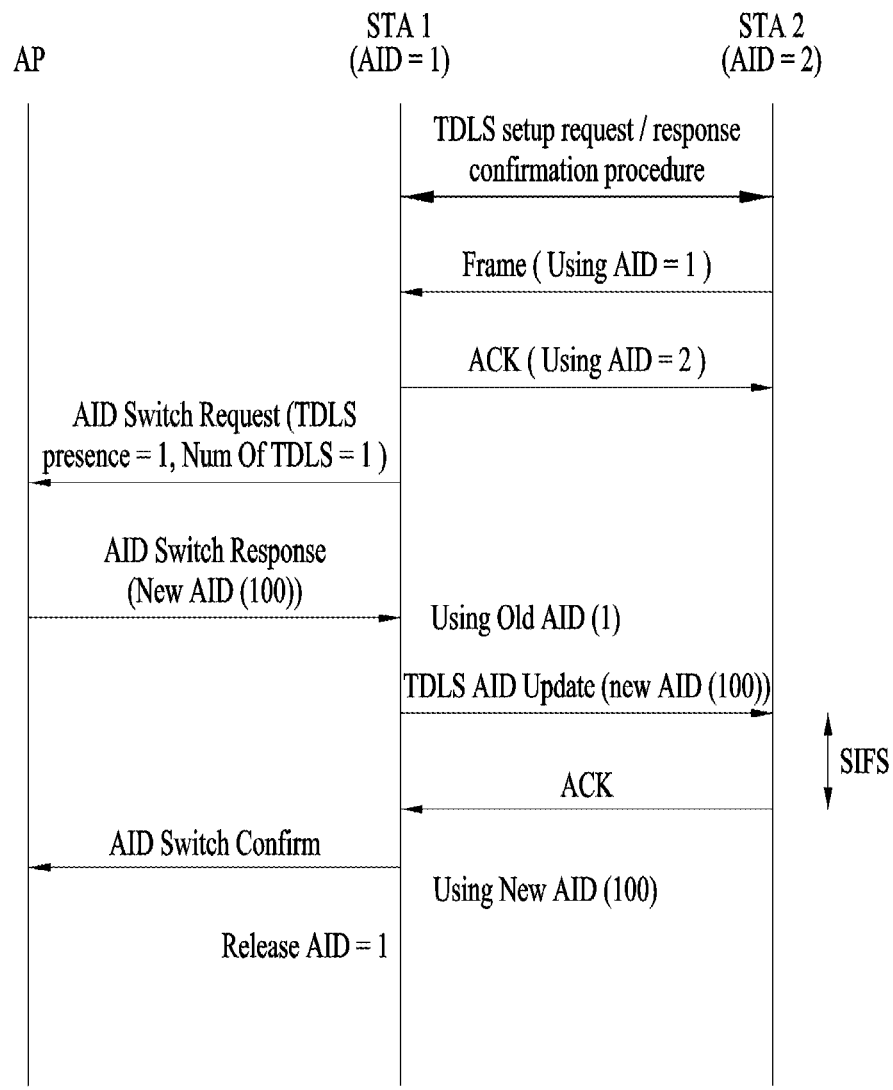

As such, if the parameter TDSL presence is included in the AID switch request frame and set to 1, the AID switch request frame may further include information (Num of TDLS) indicating the number of provided TDLS connections, which is shown in FIG. 39.

Figure 40:
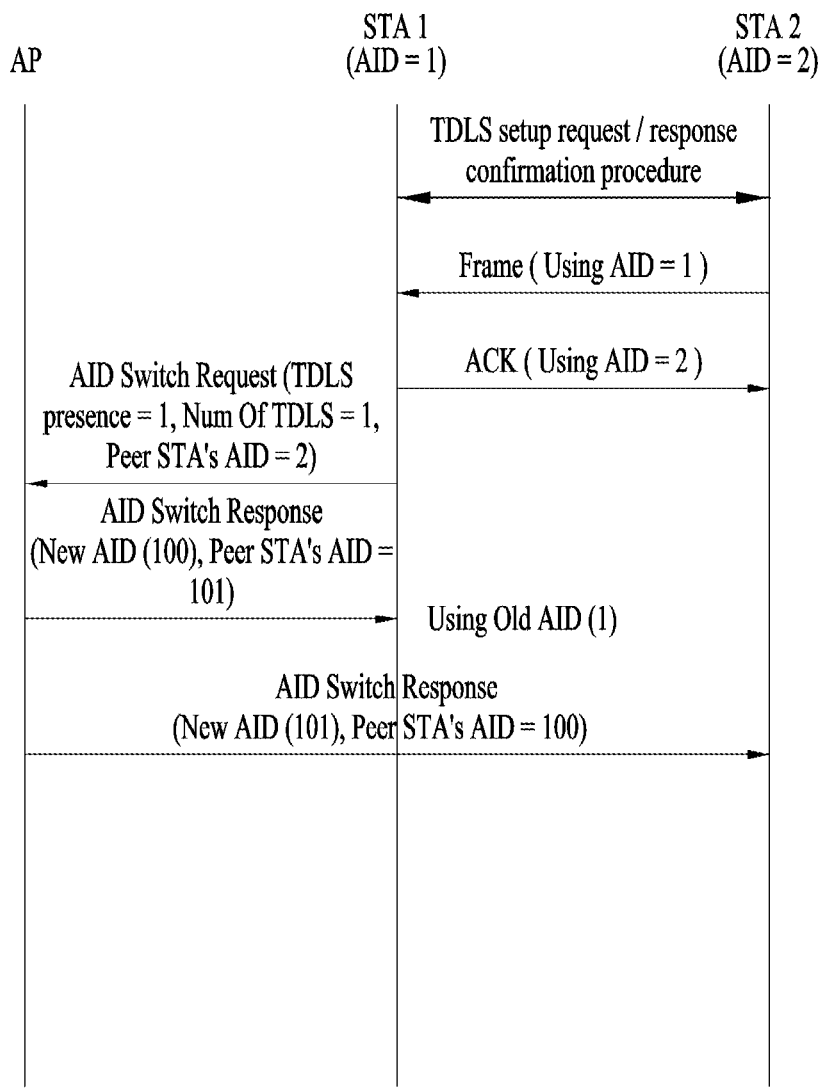

FIG. 40 illustrates an exemplary AID switch request frame including an AID of an STA (Peer STA's AID) to which STA 1 has a direct link. If the AP receives this AID switch request frame, the AP may assign AIDs belonging to the same group (or the same listen interval) as AIDs of STA 1 and STA 2. The AP may transmit the new AID of STA 1 and the AID of STA 2 to STA 1 together. Additionally, the AP may also transmit a switch response frame containing AID switch information (STA1's new AID, STA2's new AID) to STA 2.

Figure 41:
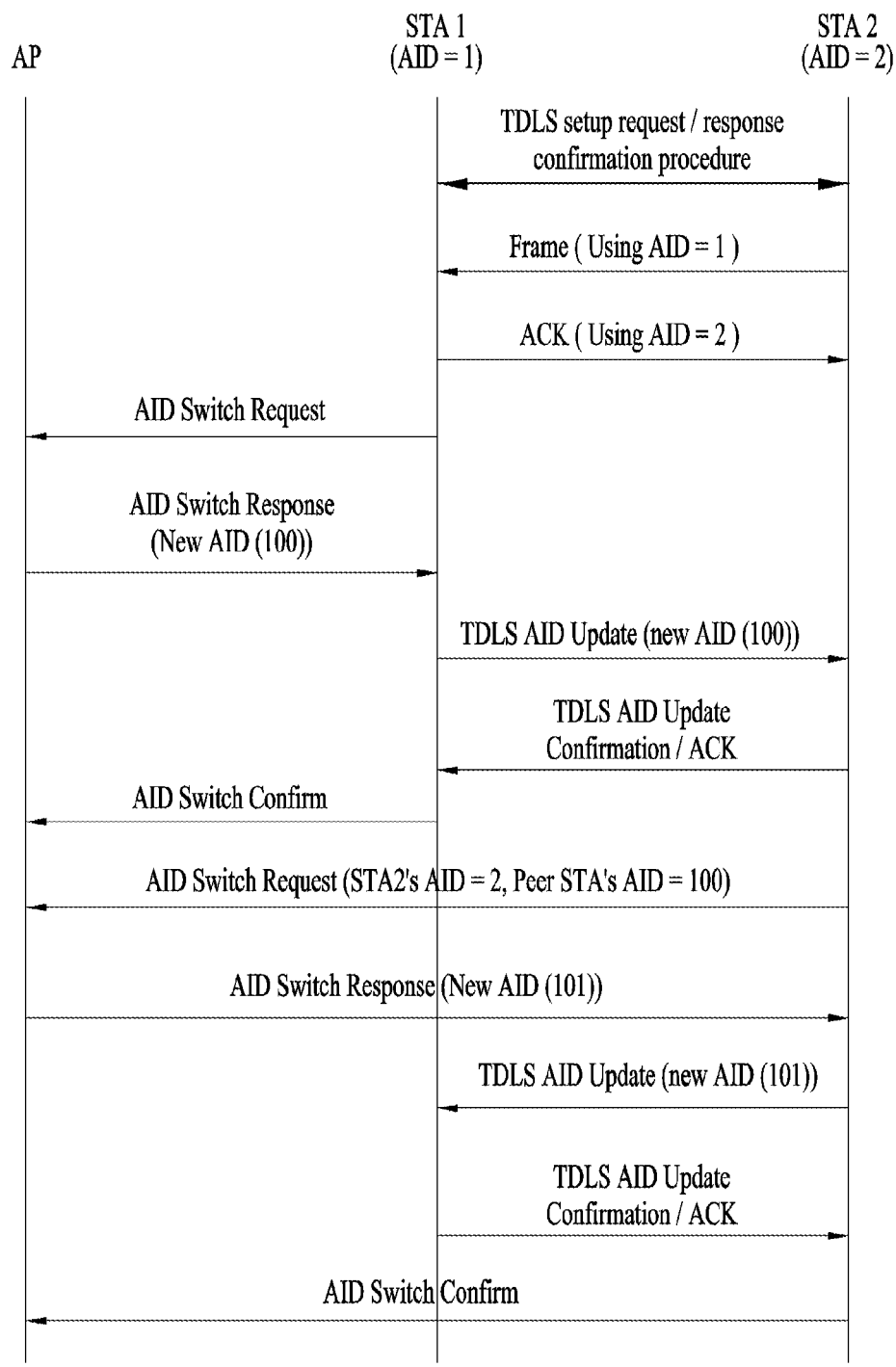

In FIG. 41, after STA 2 updates the AID of STA 1, STA2 transmits an AID switch request frame to the AP. Thereby, STA 2 may request that an AID belonging to the same group or segment as the new AID of STA 1. Accordingly, the AID switch request frame transmitted from STA 2 to the AP may include the AID of STA 2 and the new updated AID of STA 1. In other words, due to change of the AID of STA 1, AIDs of STA 1 and STA 2 come to belong to different groups/ segments, and if STA 2 desires to continue to maintain the TDLS link with STA 1, STA 2 transmits an AID switch request frame to the AP. The AP may transmit, to STA 2, an AID switch response frame containing the new AID of STA 2 (belonging to the same group or segment as the new AID of STA 1) in response to the AID request frame from STA 2. In this case, the AID of STA 2 is changed and thus a procedure (TDLS AID update frame transmission and TDLS AID update confirm/ACK frame reception) for AID update of the peer STAs of STA 2 (including STA 1) may be performed.

Figure 42:
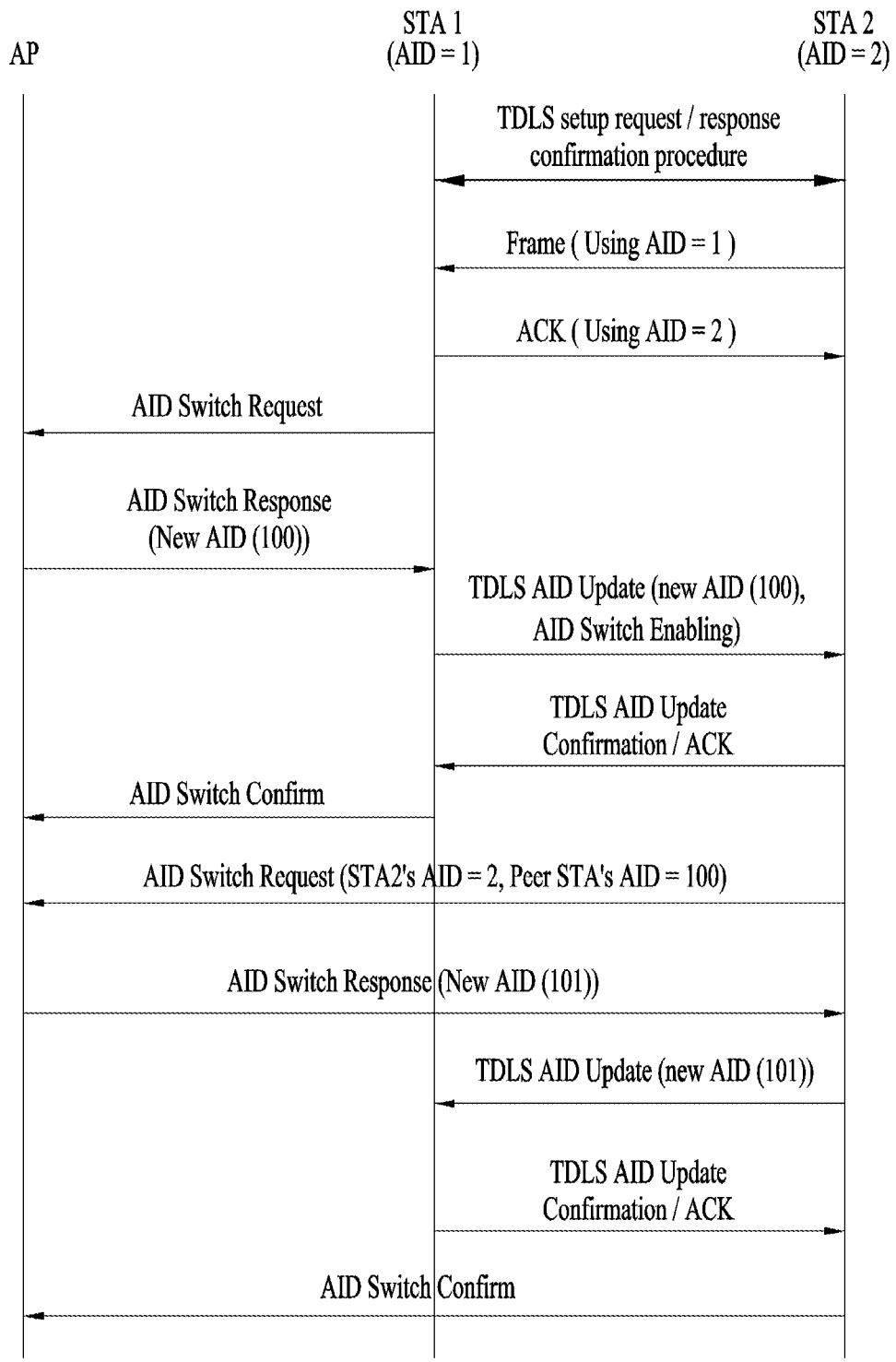

If the new AID assigned to STA 1 belongs to a different group/segment over the AID of STA 2, STA 1 may transmit, to o STA 2, an indicator indicating that STA 2 should receive an AID of the same group as STA 1 (the AID of STA 2 should be changed to an AID of the same group as that of STA 1). For example, as shown in FIG. 42, STA 1 may update the AID thereof to a new AID (AID 100) assigned by the AP, and then include AID switch enabling information in a TDLS AID update frame when transmitting the TDLS AID update frame to STA 2. Herein, the AID switch enabling information is information for requesting STA 2 to change the AID, specifically information through which STA 1 request that the AID be changed to an AID of the same group/segment as the AID of STA 1. Accordingly, in this case, STA 2 should essentially transmit an AID switch request frame to the AP.

Figure 43:
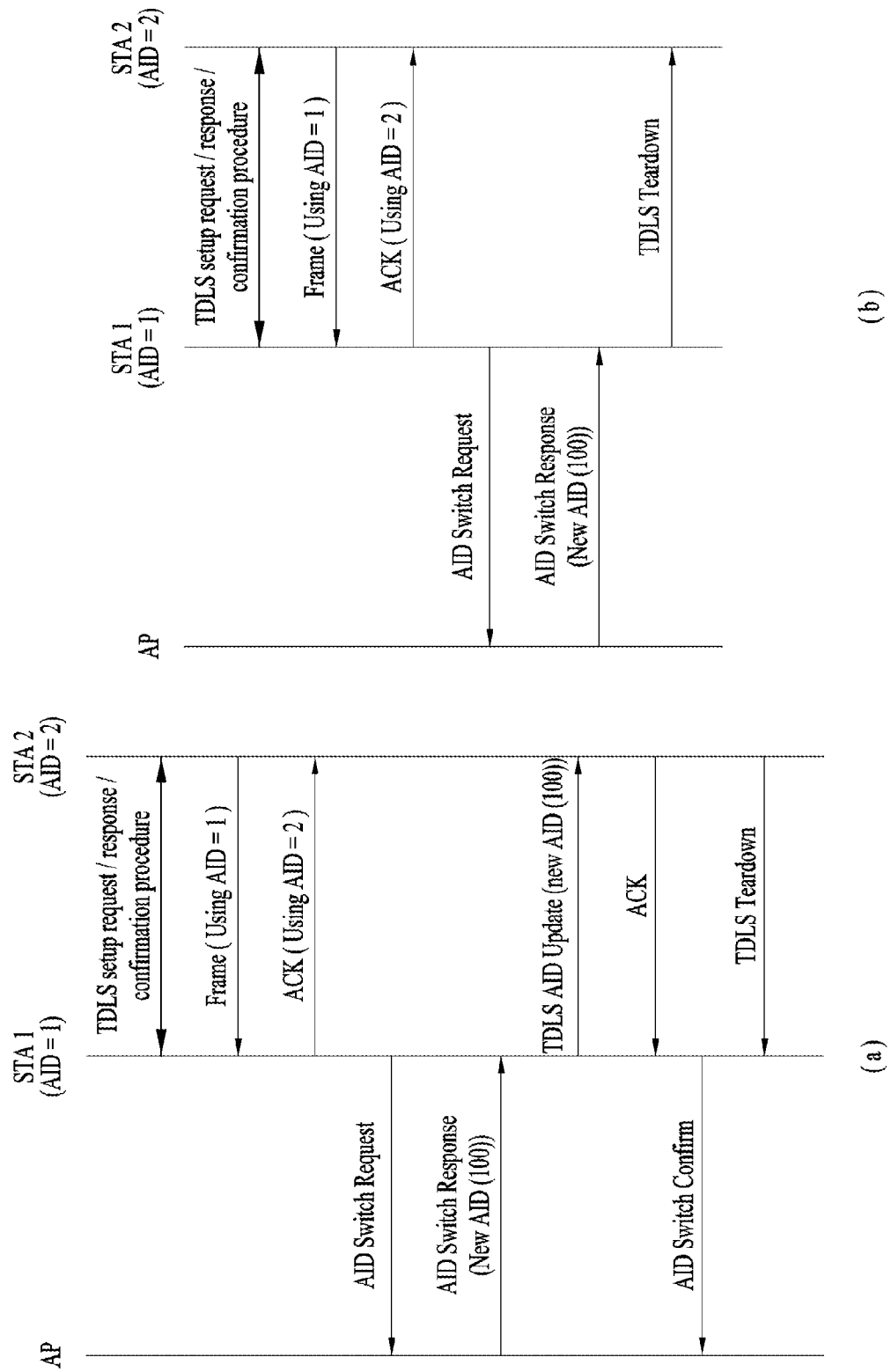

If it is difficult for STA 2 to maintain a TDLS link with STA 1, STA 2 may transmit a frame (TDLS Teardown frame) indicating/requesting release of the TDLS link, as shown in FIG. 43(*a*). The TDLS Teardown frame may be a frame which STA 1 transmits to the STA 2 after receiving a new AID, as shown in FIG. 43(*b*).

Figure 44:
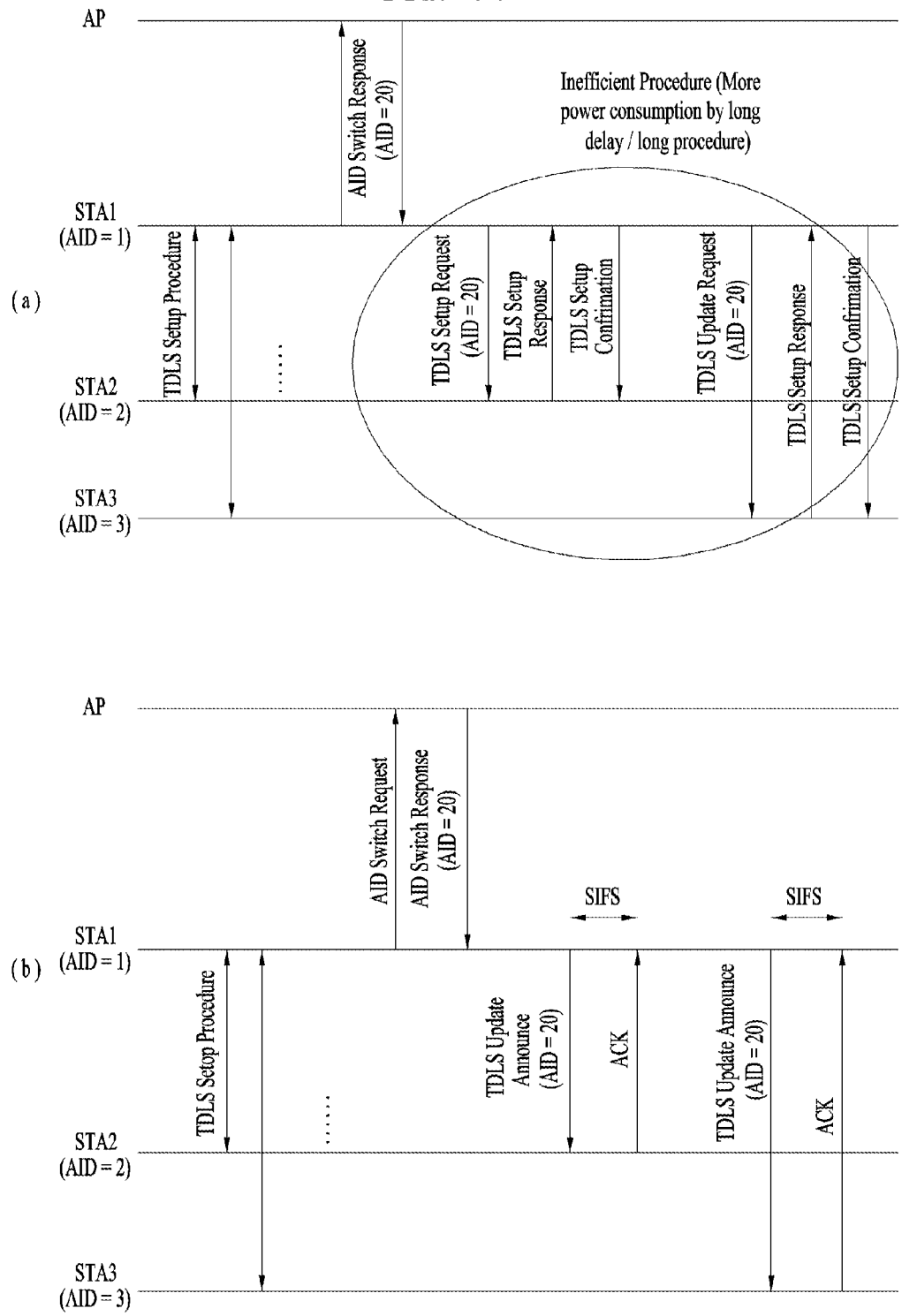
FIG. 44 illustrates a processing time according to the first embodiment.

If an announcement frame is transmitted as shown in FIG. 44, the frame indicates a gain in processing time compared to a conventional case. Specifically, referring to FIG. 44(*a*), in a conventional case, a processing time corresponding to '3–EDCA time (random back off+AIFS)+frames's transmission time (TDLS Setup request frame+TDLS Setup response frame+TDLS Setup Confirmation frame+3–ACK frames)+3–SIFS' is needed. Referring to FIG. 44(*b*), when the present invention is applied, a processing time corresponding to 'EDCA time+TDLS Update Announce TX time+SIFS+ACK TX time' is needed, and thus a significant amount of time may be reduced, compared to the case of FIG. 44(*a*).

Embodiment 2—Timer-Based Operation

An STA having been reassigned an AID may use both AIDs for a specific timer (or specific period) based on timer information (or period information) received from the AP. Thereby, the STA having been reassigned an AID may perform data transmission/reception with another STA to which a direct link was already established before the AID was reassigned, using the old AID set prior to update, until the determined timer expires. Thereby, communication with another STA to which the direct link is set up may be smoothly maintained. Until the timer expires, the STA reassigned an AID may perform data transmission/reception with the AP using one of the reassigned AID and the AID used before reassignment. A relevant specific example is illustrated in FIG. 45.

Figure 45:
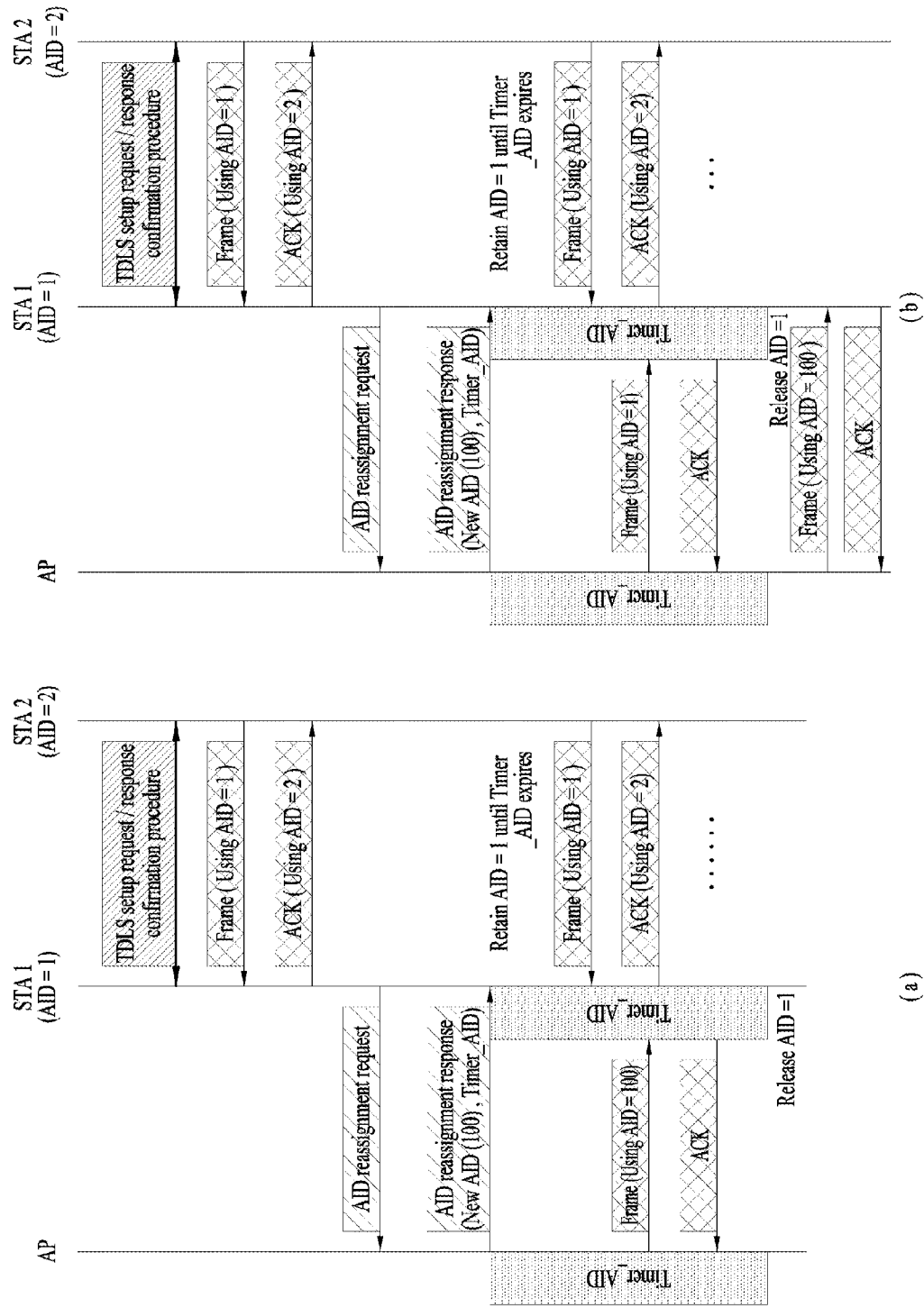
FIGS. 45 to 47 illustrate a second embodiment of the present invention and variants thereof.

FIG. 45 illustrates a case where an STA which is reassigned an AID uses two AIDs. In the example of FIG. 45, a direct link is set up between STA 1 and STA 2 through TDLS before STA 1 is reassigned an AID. Further, AID reassignment is performed as STA 1 transmits an AID reassignment request frame to the AP, and the AP transmits, in response, an AID reassignment response frame including reassigned AID information (New AID) and timer information (Timer_AID). Until STA 1 is reassigned a new AID, STA 1 and STA 2 may perform communication using the old AID (set to 1 in FIG. 45).

If STA 1 is reassigned an AID, the AP and STA 1 may start the timer. Until the timer expires, STA 1 may use both the newly assigned AID (indicated by 100 in FIG. 45) and the old AID (indicated by 1 in FIG. 45). Thereby, STA 1 may recognize, as a frame thereof, a frame which STA 2 unaware of AID update transmits including AID 1, and decode the frame. STA 1 may perform data communication with the AP using one of the new AID 100 and the old AID 1. In the example of FIG. 45(*a*), the AP and STA 1 communicate with each other using the reassigned AID 100 until the timer expires. Alternatively, the AP and STA 1 may communicate with each other using the old AID 1 until the timer expires.

Once the timer expires, STA 1 return the previously assigned AID 1, and the AP is allowed to assign AID 1 to another STA from the time the timer expires. When the timer expires, STA 1 and the AP will communicate with each other using the newly assigned AID 100.

Allowing an STA to use two AIDs until the timer expires is simply a temporary expedient. For example, the STA uses only the reassigned AID after the timer expires, and accordingly a problem may occur when the STA communicate with a counterpart STA unaware of AID update. To solve this problem, before the timer expires, the STA may inform the counterpart STA to which a direct link is set up of update of the AID. Specifically, the STA may transmit an update request frame containing newly assigned AID information to the counterpart STA to inform the counterpart STA that the AID has been updated. Then, the counterpart STA may transmit an update response frame to the STA in response to the update request frame. A detailed description will be given below with reference to FIGS. 46 and 47.

Figure 46:
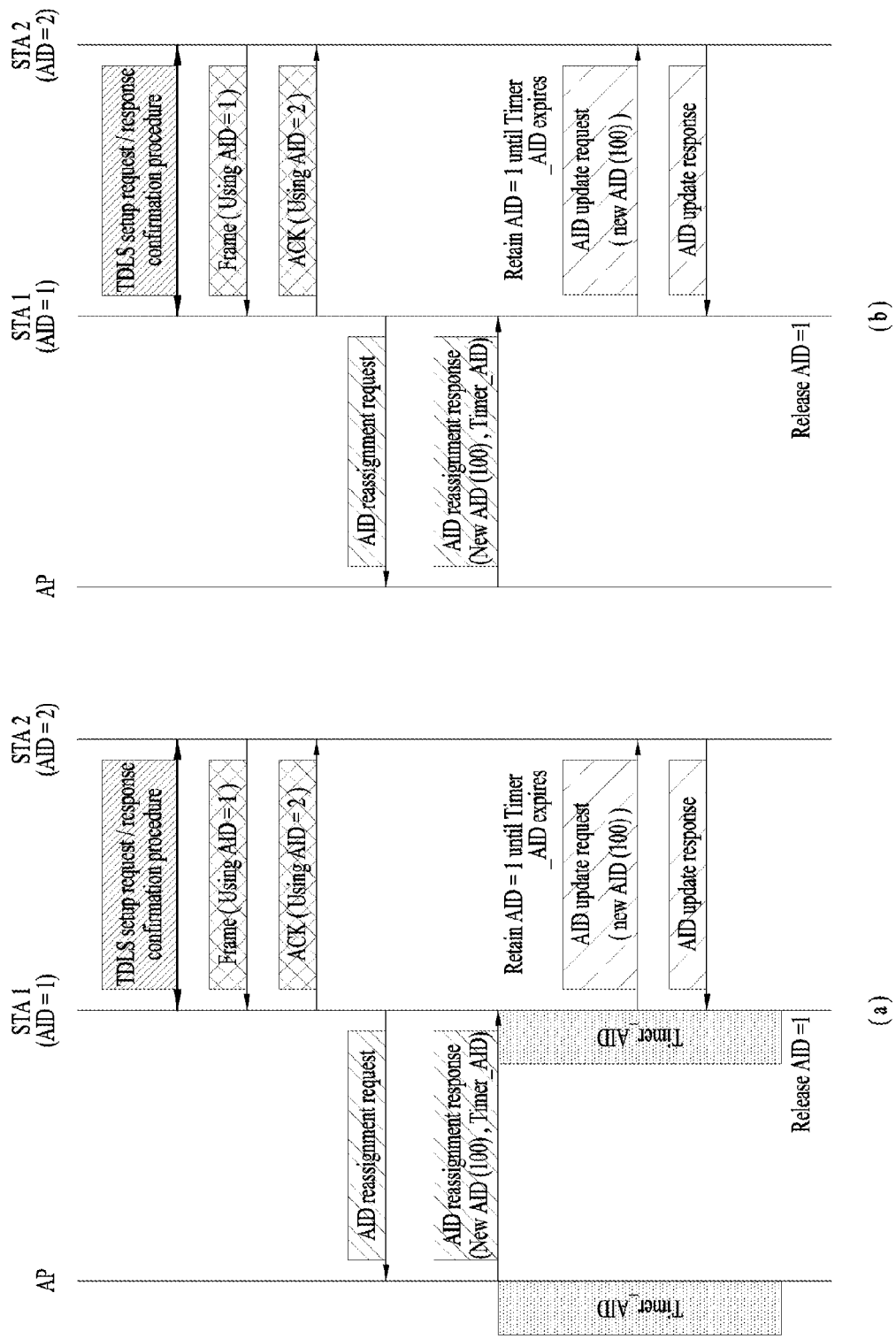

FIG. 46 illustrates a case which the STA reports AID update to the counterpart STA.

In the example illustrated in FIG. 46(*a*), STA 1 assigned a new AID 100 from the AP may start a timer, and maintain the old AID 1 until the timer expires. Thereby, STA 2 may communicate with STA 1 using AID 1 previously used by STA 1 until STA 2 recognizes AID update of STA 1. To report the AID update of STA 1 to STA 2 to which the direct link is established, STA 1 may transmit an AID update request frame containing newly assigned AID information (New AID). If the direct link between STA 1 and STA 2 is based in TDLS, the AID update request frame may be referred to as a TDLS AID update request frame.

Upon receiving the AID update request frame, STA 2 may recognize AID change of STA 1, and transmit an AID update response frame in response to the AID update request frame. If the direct link between STA 1 and STA 2 is based in TDLS, the AID update response frame may be referred to as a TDLS AID response frame.

Since STA 2 has recognized that the AID of STA 1 was changed from 1 to 100 through the AID update, STA 2 may continue to communicate with STA 1 using the new AID reassigned to STA 1.

While FIG. 46(*a*) illustrates that transmission of the AID update request frame and AID update response frame are performed before the timer expires, embodiments of the present invention are not limited thereto. For example, if AID update is not effectively completed until the timer expires, the AID update request frame and AID update response frame may be transmitted after the timer expires.

In the example of FIG. 46(a), an AID update request frame and AID update response frame are given as examples of the update request frame and update response frame. Alternatively, conventionally defined frames may be used as the update request frame and update response frame. For example, the update request frame may include a TDLS Setup request frame, and the update response frame may include a TDLS Setup response frame. in some cases, the STA may employ a TDLS Setup confirm frame in response to the TDLS Setup response frame transmitted from the counterpart STA. A detailed description will be given below with reference to FIG. 47.

Figure 47:
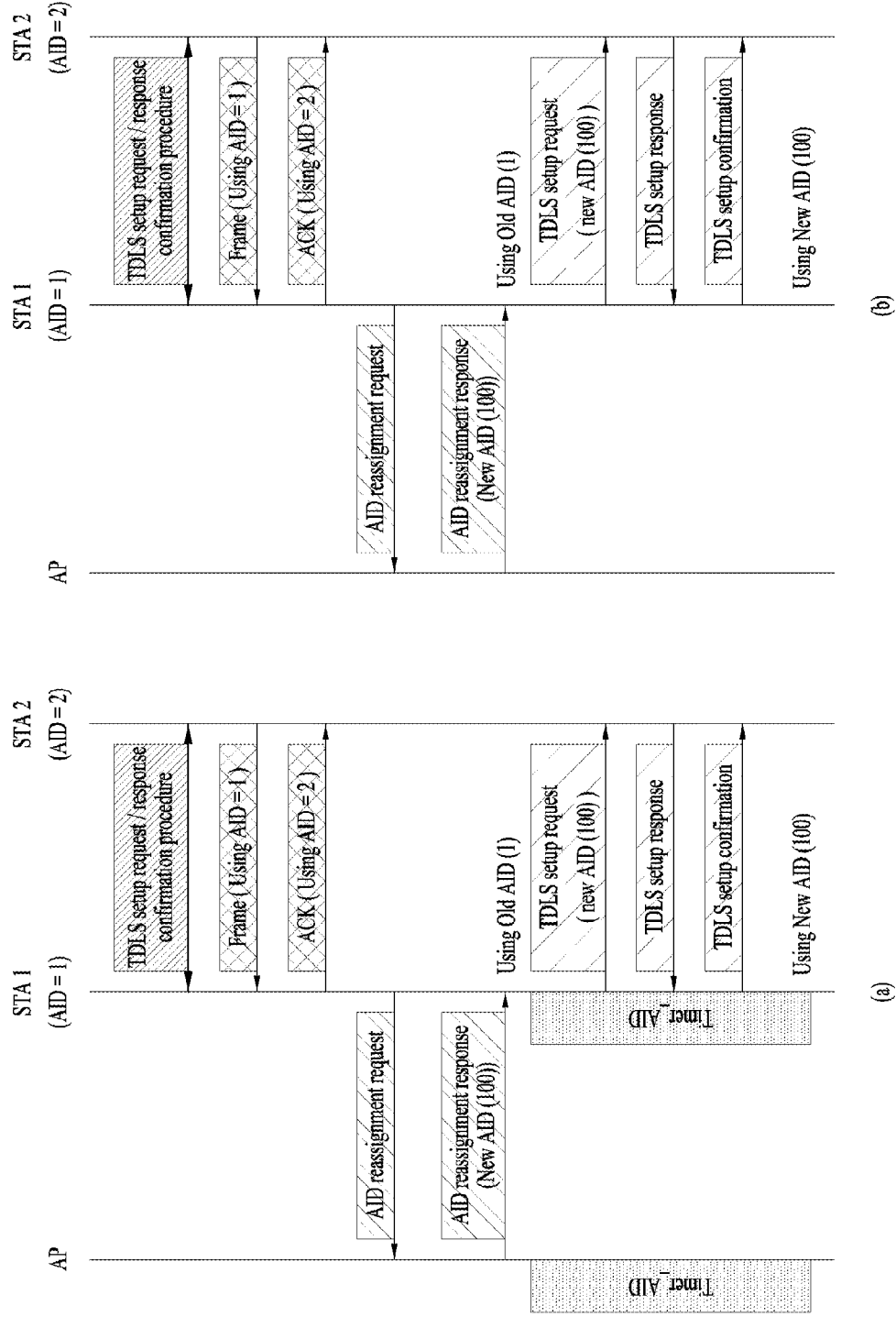

FIG. 47 illustrates a case where an AID updated through TDLS management action frames is provided to the counterpart STA. As shown in FIG. 47(a), STA 1 having been reassigned an AID by the AP may transmit, to STA 2, a TDLS Setup request frame containing newly assigned AID information (New AID). STA 2 may recognize AID change of STA 1 using the newly assigned AID information contained in the TDLS Setup request frame. STA 2 may transmit a TDLS Setup response frame in response to the TDLS Setup request frame, and STA 1 may transmit a TDLS Setup confirm frame in response to the TDLS Setup response frame. Thereby, the AID update procedure may be completed. STA 1 having been assigned the new AID 100 may start the timer and maintain the old AID 1 until the timer expires, as in the previous example of FIG. 30(a).

According to an embodiment of the present invention, if an STA having updated the AID is configured to report the updated AID to a counterpart STA as shown in FIGS. 46(b) and 47(b), the process of transceiving the timer information and starting the timer between the AP updating the AID and the STA may be omitted. If the time taken for the STA to transmit the updated AID to the counterpart STA is very short, an error is little likely to occur during communication between the STA and the counterpart STA even if the STA does not uses two AIDs. In this case, to minimize a problem occurring during communication between the STA and the counterpart STA, the STA may need to report the updated AID to the counterpart STA immediately after AID reassignment.

Although not shown in the figure, the update response frame may include an ACK frame. That is, the counterpart STA may transmit an ACK frame in response to the update request frame from the STA.

Embodiment 3—Stopping Partial AID PHY Filtering for Predetermined Period

If an STA having been reassigned an AID by the AP has a direct link, the STA may stop the function of Partial AID PHY filtering until the STA reports the changed AID to counterpart STAs (namely, until the AID update procedure is completed). If the function of Partial AID PHY filtering is stopped, the STA may decode all MAC headers of frames transmitted from the counterpart STAs and check whether the STA is the destination of the frames. Thereafter, when the AID update procedure is completed, the STA may resume the function of Partial AID PHY filtering and confirm the Partial AID to identify whether the STA is the destination of a transmitted frame.

Thereby, the STA may perform unnecessary frame decoding until the STA reports the changed AID to the counterpart STA, but may effectively receive a frame from a counterpart STA which is unaware of the new AID.

Configuration of Devices According to an Embodiment of the Present Invention

Figure 48:
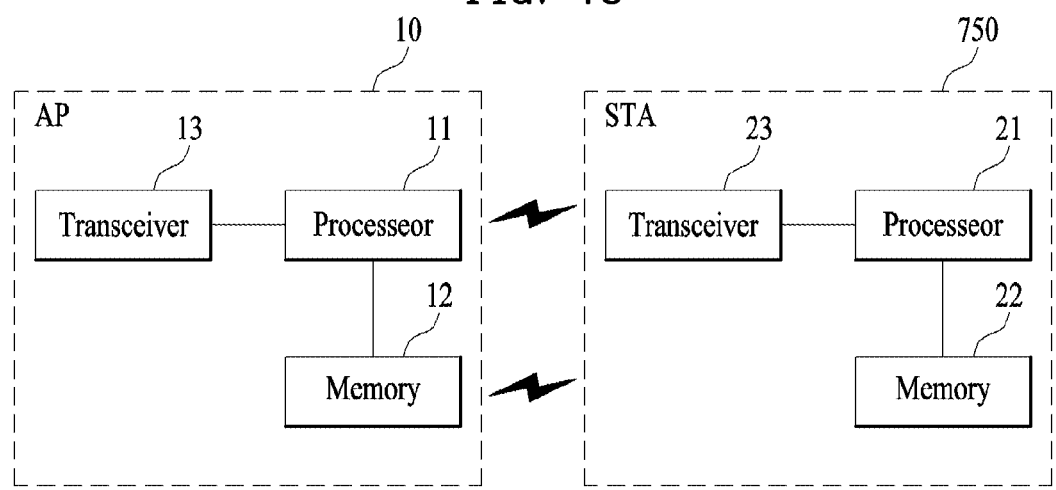
FIG. 48 illustrates configuration of devices according to an embodiment of the present invention.

FIG. 48 is a block diagram illustrating radio frequency devices according to one embodiment of the present invention.

An AP 10 may include a processor 11, a memory 12, and a transceiver 13. An STA 20 may include a processor 21, a memory 22, and a transceiver 23. The transceivers 13 and 23 may transmit/receive a radio frequency signal and implement a physical layer according to an IEEE 802 system. The processors 11 and 21 may be connected to the transceivers 13 and 21 to implement a physical layer and/or a MAC layer according to an IEEE 802 system. The processors 11 and 21 may be configured to perform various operations according to the various embodiments of the present invention described above. In addition, modules to perform operations of an AP and an STA according to the various embodiments of the present invention described above may be stored in the memories 12 and 22 and executed by the processors 11 and 21. The memories 12 and 22 may be contained in the processors 11 and 21 or may be installed at the exterior of the processors 11 and 21 and connected to the processors 11 and 21 by a well-known means.

Constituents of the AP and the STA may be provided such that details of the various embodiments of the present invention described above are independently employed or two or more embodiments are simultaneously implemented. For clarity, redundant descriptions are omitted.

The embodiments of the present invention described above may be implemented by various means. For example, the embodiments of the present invention may be implemented by hardware, firmware, software, or a combination thereof.

When implemented by hardware, a method according to embodiments of the present invention may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When implemented by firmware or software, a method according to the embodiments of the present invention may be implemented in the form of a module, a procedure, a function, or the like which performs the functions or operations described above. Software code may be stored in a memory unit and executed by the processor. The memory unit may be disposed inside or outside the processor to transceive data with the processor through various well-known means.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention without departing from the spirit and scope of the present invention. Thus, the present invention is not intended to be limited to the embodiments described herein, but is intended to have the widest scope consistent with the principles and novel features disclosed herein.

INDUSTRIAL APPLICABILITY

Various embodiments of the present invention have been described through examples applied to an IEEE 802.11 system, but they may also be applied to various wireless access systems other than the IEEE 802.11 system.

The invention claimed is:

1. A method for transmitting and receiving information related to an association identification (AID) by a second non-access point station (non-AP STA) in a wireless communication system, the method comprising:
performing, by the second non-AP STA, a direct link setup procedure with a first non-AP STA;
receiving, from the first non-AP STA by the second non-AP STA having a direct link to the first non-AP STA, an announcement frame related to an updated AID of the first non-AP STA, when an AP has changed an AID of the first non-AP STA after the direct link setup procedure; and
transmitting, to the first non-AP STA by the second non-AP STA, an acknowledgement (ACK) frame in response to the announcement frame,
wherein the announcement frame contains one or more AID-MAC address pairs, and
wherein the second non-AP STA updates the AID of the first non-AP STA to the updated AID based on the one or more AID-MAC address pairs.

2. The method according to claim 1, wherein the announcement frame contains an AID announcement element,
wherein the AID announcement element comprises the one or more AID-MAC address pairs.

3. The method according to claim 1, wherein, an MAC address of the one or more AID-MAC address pairs is an MAC address of an updated STA, and an AID of the one or more AID-MAC address pairs is an AID of an STA corresponding to the MAC address.

4. The method according to claim 1, wherein the direct link is one of tunneled direct link setup (TDLS) or direct link setup (DLS).

5. The method according to claim 1, wherein the updated AID is a new AID assigned to the first non-AP STA by the AP.

6. The method according to claim 5, wherein the new AID is delivered from the AP to the first non-AP STA through an AID switch response frame.

7. The method according to claim 1, wherein, when the updated AID belongs to a different group than an AID of the second non-AP STA, the announcement frame contains information requesting change of the AID of the second non-AP STA.

8. A method for transmitting and receiving information related to an association identification (AID) by a first non-access point station (non-AP STA) in a wireless communication system, the method comprising:
performing, by the first non-AP STA, a direct link setup procedure with a second non-AP STA;
transmitting, by a first non-AP STA, an announcement frame related to an updated AID of the first non-AP STA to the second non-AP STA having a direct link to the first non-AP STA, when an AP has changed an AID of the first non-AP STA after the direct link setup procedure; and
receiving, by the first non-AP STA, an acknowledgement (ACK) frame from the second non-AP STA in response to the announcement frame,
wherein the announcement frame contains one or more AID-MAC address pairs, and
wherein the one or more AID-MAC address pairs are used by the second non-AP STA for an update of the AID of the first non-AP STA to the updated AID of the first non-AP STA.

9. The method according to claim 8, wherein the announcement frame contains an AID announcement element,
wherein the AID announcement element comprises the one or more AID-MAC address pairs.

10. The method according to claim 8, wherein an MAC address of the one or more AID-MAC address pairs is an MAC address of an updated STA, and an AID of the one or more AID-MAC address pairs is an AID of an STA corresponding to the MAC address.

11. The method according to claim 8, wherein the direct link is one of tunneled direct link setup (TDLS) or direct link setup (DLS).

12. The method according to claim 8, wherein the updated AID is a new AID assigned to the first non-AP STA by the AP STA by the AP.

13. The method according to claim 12, further comprising:
receiving, from the AP, an AID switch response frame containing the new AID.

14. The method according to claim 13, wherein the AID switch response frame is a response to an AID switch request frame transmitted to the AP by the first non-AP STA.

15. A non-access point station (non-AP STA) in a wireless communication system, comprising:
a processor to perform a direct link setup procedure with another non-AP STA;
a receiver to receive, from the another non-AP STA, an announcement frame related to an updated AID of the another non-AP STA, when an AP has changed an AID of the another non-AP STA after the direct link setup procedure; and
a transmitter to transmit, to the another non-AP STA, an acknowledgement (ACK) frame in response to the announcement frame,
wherein the announcement frame contains one or more AID-MAC address pairs, and
wherein the processor updates the AID of the another non-AP STA to the updated AID based on the one or more AID-MAC address pairs.

* * * * *